US012563073B2

(12) United States Patent
Deol et al.

(10) Patent No.: US 12,563,073 B2
(45) Date of Patent: Feb. 24, 2026

(54) METHOD AND APPARATUS FOR NETWORK INTRUSION DETECTION USING A LATENCY-BASED TEMPORAL GRAPH EMBEDDING

(71) Applicant: HUAWEI TECHNOLOGIES CO., LTD., Shenzhen (CN)

(72) Inventors: Tanvir Singh Deol, Kanata (CA); William Carson McCormick, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 117 days.

(21) Appl. No.: 18/660,398

(22) Filed: May 10, 2024

(65) Prior Publication Data

US 2025/0350615 A1 Nov. 13, 2025

(51) Int. Cl.
*H04L 29/06* (2006.01)
*H04L 9/40* (2022.01)
(52) U.S. Cl.
CPC .............................. *H04L 63/1425* (2013.01)
(58) Field of Classification Search
CPC .................................................. H04L 63/1425
See application file for complete search history.

(56) References Cited

U.S. PATENT DOCUMENTS

2016/0359592 A1* 12/2016 Kulshreshtha .......... H04L 43/08
2017/0228277 A1* 8/2017 Cheng ................. G06F 11/0709

2021/0160263 A1* 5/2021 Jiang ........................ H04L 63/20
2022/0385674 A1* 12/2022 Donbosco ................ G06N 5/04
2024/0007356 A1 1/2024 Marwah et al.
2025/0023894 A1* 1/2025 Sundar .................. H04L 43/026

OTHER PUBLICATIONS

Paudel, Ramesh, and H. Howie Huang. "Pikachu: Temporal walk based dynamic graph embedding for network anomaly detection." NOMS 2022-2022 IEEE/IFIP network operations and management symposium. 2022. (Year: 2022).*
Claudio D.T. Barros, et al., "A Survey on Embedding Dynamic Graphs", arXiv.org. Jul. 22, 2021, pp. 1-10, 21-23, 27-31.
Moran Beladev et al., "TdGraphEmbed: Temporal Dynamic Graph-Level Embedding", In Proceedings of the 29th ACM International Conference on Information & Knowledge Management (CIKM '20), Oct. 19, 2020, pp. 1-6, Figure 2.
Isaiah J. King et al., "EdgeTorrent: Real-time Temporal Graph Representations for Intrusion Detection", In Proceedings of the 26th International Symposium on Research in Attacks, Intrusions and Defenses (RAID '23), Oct. 16, 2023, pp. 2-5.
Reha, J., et al., "Anomaly Detection in Continuous-time Temporal Provenance Graphs" Temporal Graph Learning Workshop, Oct. 20, 2023 , pp. 1,5,6.

* cited by examiner

*Primary Examiner* — Ka Shan Choy

(57) ABSTRACT

A method and apparatus for detecting network intrusions such as reordering attacks, e.g. in a Hyperledger™ Fabric. A temporal graph is generated which represents actions of nodes according to an ordered secure transaction process, along with latencies and ordinal values of the actions. An embedding of the temporal graph is generated in which the latencies and ordinal values are processed together. The embedding is passed to a detection module such as a machine learning system. Various potential characteristics of, and computations for generating, the embedding are also described.

20 Claims, 11 Drawing Sheets

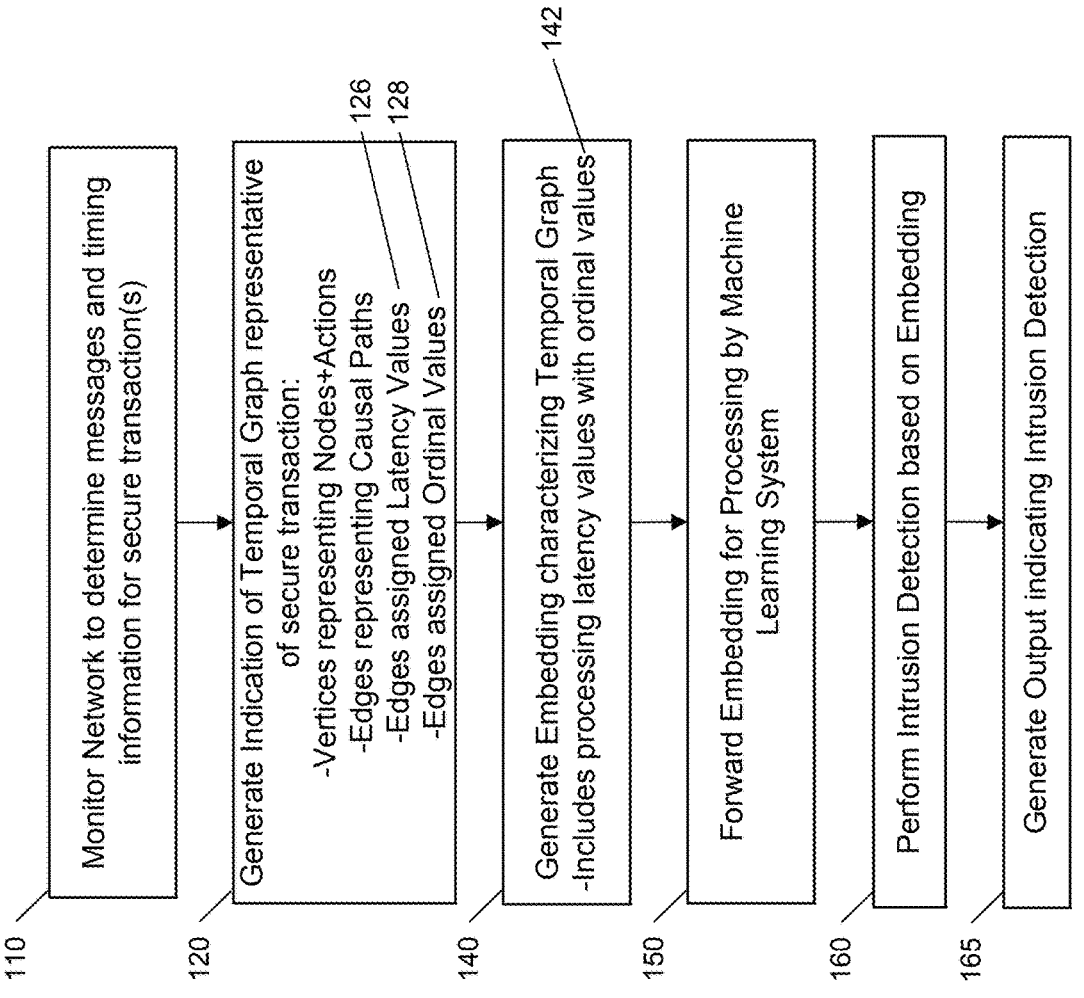

110 — Monitor Network to determine messages and timing information for secure transaction(s)

120 — Generate Indication of Temporal Graph representative of secure transaction:
-Vertices representing Nodes+Actions
-Edges representing Causal Paths
126 — -Edges assigned Latency Values
128 — -Edges assigned Ordinal Values 140 — Generate Embedding characterizing Temporal Graph
142 — -Includes processing latency values with ordinal values 150 — Forward Embedding for Processing by Machine Learning System 160 — Perform Intrusion Detection based on Embedding 165 — Generate Output indicating Intrusion Detection

FIG. 1

Temporal Graph
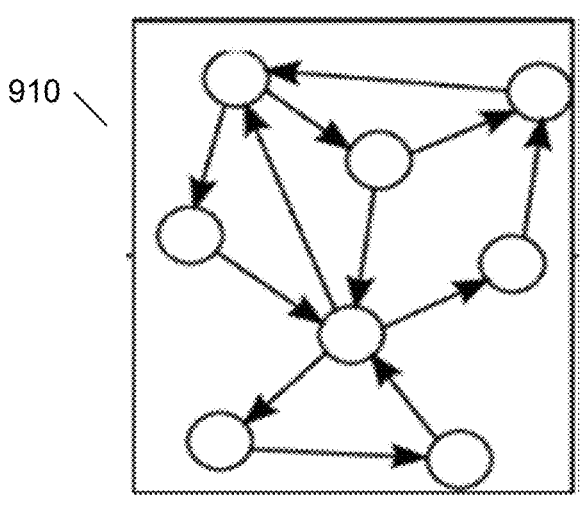
910
915
All latency
values
930
Statistical Distribution of
Latencies
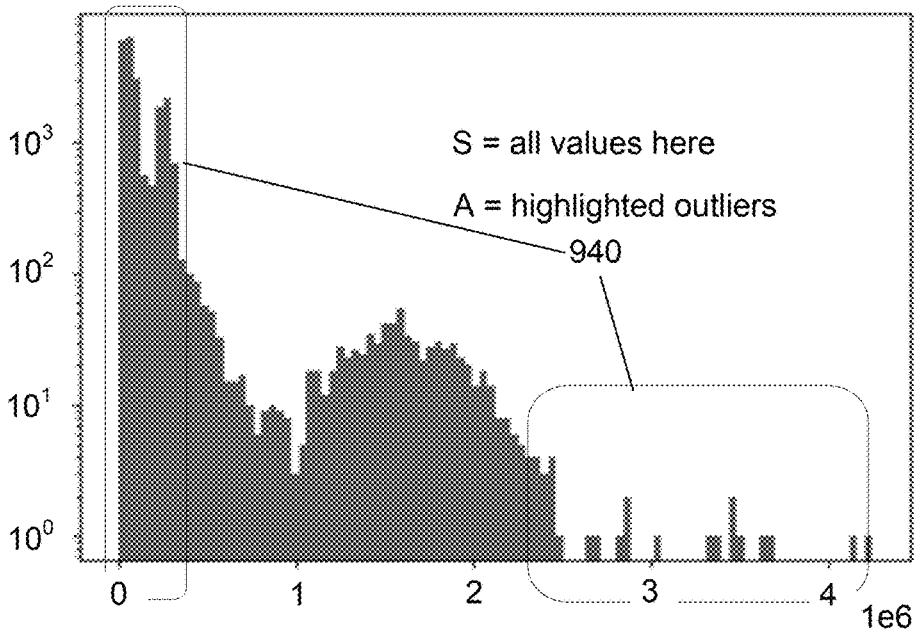
S = all values here
A = highlighted outliers
940
FIG. 7

1100

PROCESSOR
1110

SENSOR(S)
1180

MEMORY
1120

MASS
STORAGE
1130

Tx/Rx
1160

NETWORK
INTERFACE(S)
1150

I/O
INTERFACE
1140

1170

METHOD AND APPARATUS FOR NETWORK INTRUSION DETECTION USING A LATENCY-BASED TEMPORAL GRAPH EMBEDDING

CROSS-REFERENCE TO RELATED APPLICATIONS

This is the first application filed for the present disclosure.

FIELD OF THE INVENTION

The present disclosure pertains to network security, and in particular to a method and apparatus for detecting malicious network intrusions such as reordering attacks in permissioned blockchain networks.

BACKGROUND

Intrusion Detection pertains problems of identifying malicious activity in a network, given the network environment and its corresponding activity/messaging log data, via analysis of relevant data. The data being collected can include aspects such as the packet content or size, the protocol type, the number of failed logins, the timing of communication between nodes, etc. Network Intrusion Detection, in particular, pertains to cases of intrusion detection which specifically involve network layer data such as communication between nodes.

Reordering attacks represent particular types of network intrusions in which messages are maliciously repeated and/or delayed. In some instances of reordering attacks, certain nodes, tasked with transmitting messages, maliciously delay these messages as part of an attack. Networks such as permissioned blockchain (e.g. Hyperledger™ Fabric) networks can be susceptible to such attacks which may compromise corresponding secure transactions.

It is desirable to be able to detect and subsequently defend against malicious network activities, particularly in the case of reordering attacks in networks such as those mentioned above. However, to date, automated systems for performing the required intrusion detection are still being developed, or are subject to certain inefficiencies or deficiencies. Potentially applicable research on the subject is also limited.

Therefore, there is a need for a method and apparatus for network intrusion detection that obviates or mitigates one or more limitations of the prior art.

This background information is provided to reveal information believed by the applicant to be of possible relevance to the present disclosure. No admission is necessarily intended, nor should be construed, that any of the preceding information constitutes prior art against the present disclosure.

SUMMARY

An object of embodiments of the present disclosure is to provide a method and apparatus for network intrusion detection. Embodiments utilize temporal graphs indicating network messaging supporting secure transactions, along with indications of the latencies of such messages and/or associated events. Embodiments are applicable to multi-step processes involving multiple network nodes in the network. Furthermore, embodiments implement an embedding of such temporal graphs to encode the graph information into a related vector of information. The embedding is created such that it is appropriate to be processed, by a machine learning system, in order to detect network intrusions.

In accordance with embodiments of the present disclosure, there is provided an apparatus which may include a computer or other type of electronic controller.

In accordance with embodiments of the present disclosure, there is provided a method, for execution by a computer or other type of electronic controller (e.g. by an apparatus such as is described above).

According to an aspect of the present disclosure, there is provided a method for facilitating intrusion detection in a network having network nodes communicating messages to one another to support secure transactions. For example, the network may implement a permissioned blockchain to carry out the secure transaction. The permissioned blockchain may correspond to a Hyperledger™ fabric. The intrusion may involve a reordering attack, which may be a latency-based attack involving one or more of the nodes delaying transmission of one or more of the messages. The method, performed automatically by a computer may include the following operations. The method may include monitoring the network to determine, for one instance of the secure transactions, occurrences of the messages and associated timing information corresponding to that instance. The method includes generating, based on such monitoring, an indication of a temporal graph having vertices representing the actions of the network nodes and edges representing causal paths between the vertices. The causal paths can include the messages, e.g. node-to-node paths of the messages. Some or all of the causal paths are associated with a corresponding latency value and a corresponding ordinal value. The latency value is indicative of an amount of time delay introduced at one of the nodes in association with generating the corresponding one of the causal paths. The ordinal value is indicative of a relative order, within a prescribed, ordered multi-step process, of this corresponding one of the causal paths. Each of the edges is assigned one of the latency values and one of the ordinal values. The method includes generating an embedding characterizing the temporal graph. The generating of the embedding includes processing instances of the latency values together with instances of the ordinal values. Furthermore, the processing includes, for at least one (and potentially all) of the causal paths, processing the corresponding latency value of that one of the causal paths together with the corresponding ordinal value of that same one of the causal paths. The method may include forwarding the embedding for processing by a machine learning system. The method may include performing, by the machine learning system, the intrusion detection based on the embedding, and generating an output of the intrusion detection, e.g. indicating whether or not an intrusion was detected.

In some possible implementations, the embedding comprises multiple values representable as a vector.

In some possible implementations, for each one of the causal paths, the corresponding latency value, the corresponding ordinal value, and that one of the causal paths collectively define a corresponding triple. Furthermore, generating the embedding includes the following determinations. The determinations include determining a vector A formed of instances of the latency values which are statistical outliers relative to a vector S comprising all of the latency values. The determinations include determining the vector S formed of all of the latency values. The determinations include determining a vector $O_A$ formed of instances of the ordinal values, each $n^{th}$ entry in the vector $O_A$ being the corresponding ordinal value of the triple having its corresponding latency value as the $n^{th}$ entry in the vector A. The determinations include determining a vector $O_S$ formed of instances of the ordinal values, each $n^{th}$ entry in the vector $O_S$ being the corresponding ordinal value of the triple having its corresponding latency value as the $n^{th}$ entry in the vector S.

In some further possible implementations, generating the embedding comprises processing the vector A, the vector S, the vector $O_A$ and the vector $O_S$ using one or more operations to generate processed information. In some embodiments, this processed information forms part or all of the embedding. In some embodiments, generating the embedding comprises further processing of the processed information according to one or more statistical measures, and output of the further processing forms part or all of the embedding.

In some possible implementations, the above-mentioned one or more operations include one or more of the following computations. The computations include computing a Hadamard product between the vector A and the vector $O_A$. The computations include computing a Hadamard product between the vector S and the vector $O_S$. The computations include computing a dot (inner) product between the vector A and the vector $O_A$. The computations include computing a dot (inner) product between the vector S and the vector $O_S$. The computations include computing a statistical distance between: a statistical distribution representative of the vector A; and a reference statistical distribution indicative of the latency values in absence of the intrusion. The computations include computing a statistical distance between: a statistical distribution representative of the vector S; and the reference statistical distribution. In some embodiments, the reference statistical distribution against which the statistical distribution representative of the vector A is compared is not necessarily the same as is not necessarily the same as the reference statistical distribution against which the statistical distribution representative of the vector S is compared.

In some further possible implementations, generating the embedding includes further processing of the processed information according to one or more statistical measures. Output of the further processing forms part or all of the embedding. This further processing includes generating the statistical measures for one or more of: the Hadamard product between the vector A and the vector $O_A$; and the Hadamard product between the vector S and the vector $O_S$.

In some possible implementations, the reference statistical distribution is based on a history of secure transactions executed in the network prior to the instance of the secure transaction currently under evaluation.

In various possible implementations, the statistical distance is a Kullback-Leibler divergence, a Jensen-Shannon divergence or a Kolmogorov-Smirnov statistic, or the like, or a combination thereof.

In some possible implementations, the determining the vector A is performed using an unsupervised isolation forest machine learning operation.

According to an aspect of the present disclosure, there is provided a computing apparatus for facilitating intrusion detection in a network having network nodes communicating messages to one another to support secure transactions. The apparatus may be configured to monitor the network to determine, for one instance of the secure transactions, occurrences of the messages and associated timing information corresponding to said one instance. The apparatus is configured to generate, based on the monitoring, an indication of a temporal graph having vertices representing actions of the network nodes and edges representing causal paths (e.g. messages) between the vertices. Some or all of the causal paths are associated with a corresponding latency value and a corresponding ordinal value. The latency value is indicative of an amount of time delay introduced at one of the nodes in association with generating said one of the causal paths. The ordinal value is indicative of a relative order, within a prescribed, ordered multi-step process, of the associated one of the causal paths. Each of the edges is assigned one of the latency values and one of the ordinal values. The apparatus is configured to generate an embedding characterizing the temporal graph. The generating of the embedding includes processing instances of the latency values together with instances of the ordinal values. This includes, for at least one of the causal paths, processing the corresponding latency value of that one of the causal paths together with the corresponding ordinal value of that same one of the causal paths. The apparatus may further be configured to forward the embedding for processing by a machine learning system. The apparatus may further be configured to perform, by the machine learning system, the intrusion detection based on the embedding, and generate an output of the intrusion detection, e.g. indicating whether or not an intrusion was detected.

Other aspects and possible implementations of the apparatus may be provided for, commensurate with the method as already described above or elsewhere herein.

According to possible implementations, multiple methods or apparatuses may interact together in a system, each method or apparatus as described above, and in the presence of each other. A system may include, for example, a monitoring apparatus for monitoring the network to determine the messages and timing information, one or more apparatuses for generating the temporal graph and the temporal graph embedding, and one or more apparatuses implementing the machine learning system.

Aspects and possible implementations have been described above in conjunctions with aspects of the present disclosure upon which they can be implemented. Those skilled in the art will appreciate that embodiments may be implemented in conjunction with the aspect with which they are described, but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

BRIEF DESCRIPTION OF THE FIGURES

Further features and advantages of the present disclosure will become apparent from the following detailed description, taken in combination with the appended drawings, in which:

FIG. 1 illustrates a method for supporting intrusion detection, according to embodiments of the present disclosure.

FIG. 7 illustrates distributions of latency values generated according to embodiments of the present disclosure.

It will be noted that throughout the appended drawings, like features are identified by like reference numerals.

DETAILED DESCRIPTION

Figure 2A:
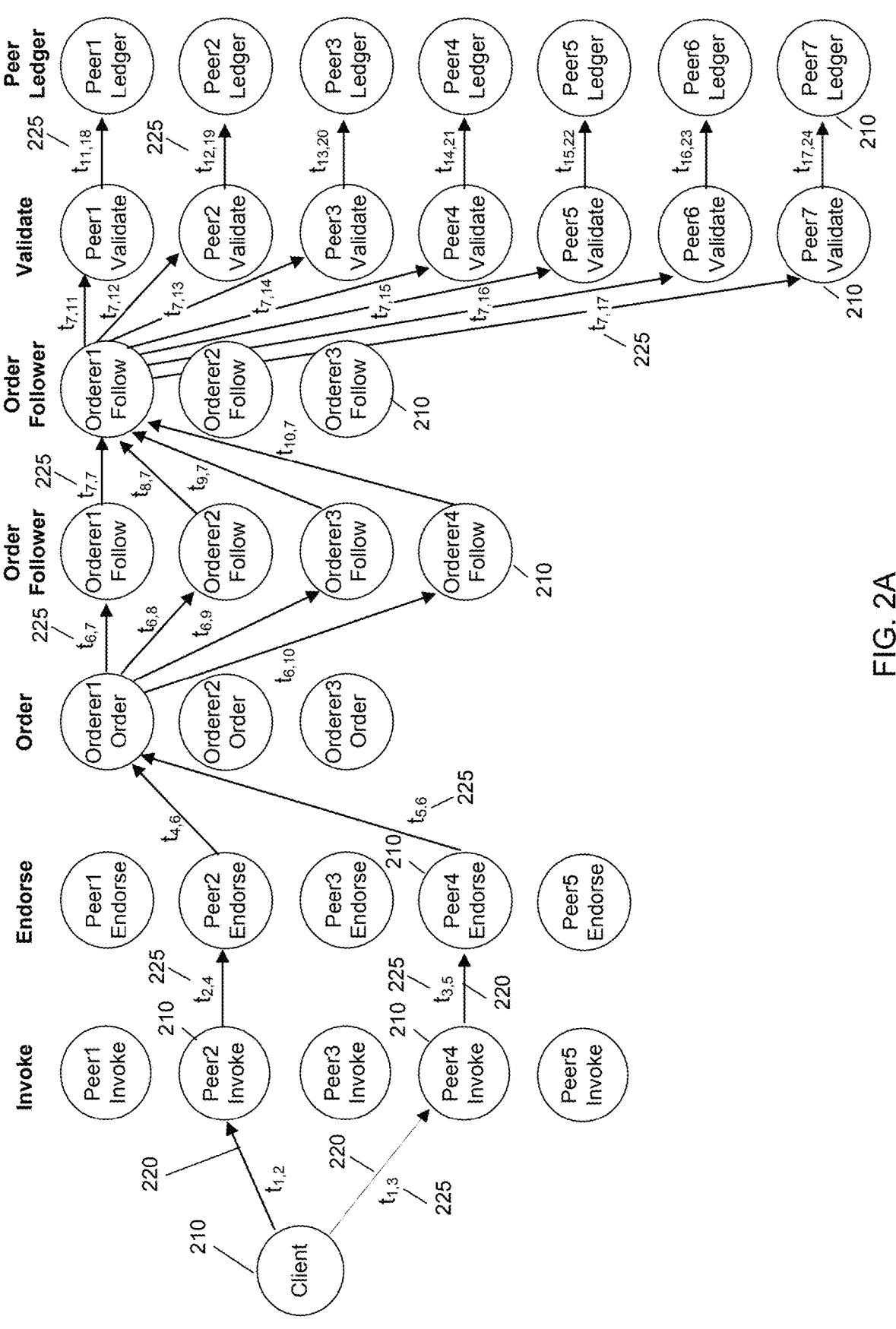
FIG. 2A illustrates an example of a temporal graph, with edges assigned timestamp values, according to embodiments of the present disclosure.

The present disclosure sets forth various embodiments via the use of block diagrams, flowcharts, and examples. Insofar as such block diagrams, flowcharts, and examples contain one or more functions and/or operations, it will be understood by a person skilled in the art that each function and/or operation within such block diagrams, flowcharts, and examples can be implemented, individually or collectively, by a wide range of hardware, software, firmware, or combination thereof. As used herein, the term "about" should be read as including variation from the nominal value, for example, a +/−10% variation from the nominal value. It is to be understood that such a variation is always included in a given value provided herein, whether or not it is specifically referred to.

Certain definitions relevant to embodiments of the present disclosure are provided below. These definitions are intended to provide clarity and are not necessarily intended to be limiting.

Directed Graph: A graph where edges only point in one direction rather than both directions.

Graph Topology: The topology of a graph is the way that nodes and edges are arranged in a network.

Intrusion Detection System: A system that monitors for and flags potentially malicious activity in a network.

Continuous-Time Network Model: A way of representing a temporal graph, where timestamped edges over a continuous time span are aggregated into one graph rather than many.

Graph level Embeddings: Embedding that capture the properties of an entire graph.

Whole-time Embedding: A way to represent temporal graph embeddings, where an embedding represents a temporal graph over its entire time span.

Decision Trees: Supervised machine learning algorithm where a tree is used to split the training data by some learned thresholds/conditions.

Random Forests: Supervised machine learning algorithm that aggregates and averages out the decisions made by many random decision trees.

Isolation Forest: Unsupervised machine learning algorithm based on decision trees that is used for anomaly (intrusion) detection on tabular data. An anomaly may be a data point that deviates from a related standard or normal expectation.

Gradient Boosting: An ensemble machine learning technique that improves on the performance of Random Forests by training decision trees sequentially rather than in parallel.

XGBoost: A popular, robust and fast implementation of Gradient Boosted Decision Trees.

Hyperledger™ Fabric: A popular permissioned blockchain implementation framework used by major companies.

Permissioned Blockchain: A blockchain network that you need permission to participate in. Used mainly by enterprises.

Latency: May indicate a delay; often used in the context of communication between two nodes in a computer network.

Hadamard Product: Element wise product of vectors.

Kullback Leibler (KL) Divergence: A statistical measure of the difference between two statistical distributions.

Kernel Density Estimation: A technique that helps create a smooth curve from data given from a distribution. Essentially it helps convert discrete statistical distributions into smooth continuous ones.

Ordinal Values: Values that follow an inherent ordering.

Standard Deviation: A measure of how dispersed the data is in relation to the mean.

Ledger: In the context of blockchains, a ledger is a shared immutable database for recording transactions.

Graph: a graph in the field of computer science is a data structure comprising or consisting of nodes and edges that connect certain nodes together. In the context of Intrusion Detection, a graph's nodes can represent the components of a system and the edges can represent communications that occur between certain systems. Graphs are formally denoted as G (V, E) where G is a function of the vertices of the graph V, and the edges of the graph E.

Temporal Graph: Temporal Graphs, which are also known as Dynamic Graphs are graphs that change over time. Temporal Graphs are defined over a life span T, where T is a set of time values. When T is a discrete set, the graph is a Discrete time graph, if T is continuous set, the graph is a Continuous time graph.

There are multiple ways to represent a Temporal Graph. Graph Snapshots are a way of representing a Temporal Graph as a discrete sequence of static graphs. This usually refers to Discrete Graphs as they have discrete time values. Another way to represent Temporal Graphs are Difference Network Models, which represent changes of the graph over some given time interval. The Difference Network Model can capture changes over every second, minute or some other defined time interval. These representations can be applied to either Discrete or Continuous Graphs. Third are Continuous Time Network Models which are graphs that have timestamped edges and contain a list of node interactions over time. The timestamped edges are continuous time values and the graph aggregates all edges that occur over the life span T into a single graph.

In the context of Intrusion Detection, a Temporal Graph's nodes typically represent the component actions in the network and the time-based edges represent the communications that happened between nodes at specific points in time. Two or more nodes in the temporal graph can correspond to the same physical node (device) in the network. For example, a first node in the temporal graph can represent a network node's first action (e.g. receiving a message) and a second node in the temporal graph can represent a second action by the same network node (e.g. transmitting a message based on the received message). To distinguish between nodes (separate devices) of the network and nodes of the temporal graph, the nodes of the temporal graph may be referred to as vertices or logical nodes.

Temporal Graph Embeddings: Embeddings in the context of machine learning are a numerical representation of some given object (or values), that a machine learning model can process; the numerical representation may be in the form of an n-dimensional vector, or other tuple or list, or a matrix, array, or the like. An embedding method is a defined process for converting some object into its appropriate numerical representation. Since temporal graphs are a complex data structure, they benefit from representation using an embedding method which encodes specific relevant properties in a numerical representation.

In general, Temporal Graph Embeddings are numerical representations that usually capture the structural/topological information of a graph and/or the temporal information of a graph (See e.g. C. Barros et al. 2021 July 22. "A survey on embedding dynamic graphs."). The structural/topological information of a graph refers to the connectivity between nodes, the density or sparsity of node clusters, etc. The temporal information of a graph can refer to snapshots of a graph at some specific time, the change of graph topology over some time interval, etc.

Embeddings can exist in various context of a graph. Node embeddings are embeddings that capture the properties of individual nodes in a graph. If there are N nodes in a graph, a node embedding method would output N vectors; one vector representation for each node. Edge embeddings capture the properties of individual edges in a graph. Subgraph embeddings capture the properties of subgraphs. Graph embeddings capture the properties of an entire graph, so given a graph G (V, E) a graph embedding method might output a single n-dimensional vector.

There are multiple ways that Temporal Graph Embeddings can be provided. An Embedding over Time is when an embedding method maps a graph at every time value t to a single vector. A Time-grouping Embedding is when an embedding method maps every graph over some interval $[t_1, t_2]$ to a single vector. A Whole-time Embedding is when an embedding method maps a graph containing all timestamps over life span T to a single vector.

Embodiments of the present disclosure provide a method and apparatus for facilitating intrusion detection in a network having nodes communicating messages to one another to support secure transactions. Referring to FIG. 1, the network is monitored 110 to determine, for an instance of the secure transactions, occurrences of the messages and associated timing information corresponding to that secure transaction. The monitoring is typically ongoing to cover multiple such transactions. Subsequently, based on such monitoring, an indication of a temporal graph, that is, a temporal graph representative of the transaction is generated 120.

Referring now to FIG. 2A, the temporal graph has vertices 210 representing certain actions of the network nodes, and edges 220 representing causal links between the actions. (Note, not all instances of features are labelled in the figures.) The edges connect a pair of nodes, beginning with a node which initiates the causal link and a node that is influenced by the causal link. (The edges may therefore be directed edges and the temporal graph may be a directed graph.) There are two possibilities for causal links. If the causal link (edge) connects two graph vertices which represent different network nodes, then the causal link involves a message sent via the network between these two network nodes. If the causal link (edge) connects two graph vertices which represent different actions by the same network node, then the causal link does not necessarily correspond to any message sent via the network. Rather, the causal link will more typically involve an internal logic flow within the network node. Alternatively, in this second possibility, the causal link can still be regarded in a sense as corresponding to a message, where in this case the message is an internal message within the node itself. A message in this general sense can be an internal action in which one part of the node's internal logic triggers another part of the node's internal logic to execute. It is also possible that a node will send a message to itself via the network, although this may represent an inefficient use of network resources.

In cases where monitoring only involves the monitoring of messages communicated via the network, the timestamps, latencies, or both, of causal links that are internal to a network node might not be directly observable. However, these timestamps, latencies, or both, may be inferred based on the timings of messages received by a node and messages subsequently transmitted by the node.

In more detail with respect to FIG. 2A, which is an illustrative example of a temporal graph, and reading from left to right, the nodes 210 include an initiating action by a client, "invoke" actions by peer nodes, "endorse" actions by peer nodes, "order" actions by orderer nodes, "order follow" actions by orderer nodes, "validate" actions by peer nodes, and "ledger" (writing to ledger) actions by peer nodes. Edges 220 that are diagonal correspond to causal links between graph vertices representing different nodes (e.g. from client to peer node, from peer node to orderer node or vice versa, or from one orderer node to another orderer node.) These edges thus correspond to messages between network nodes and communicated via the network. Edges that are horizontal correspond to causal links between two graph vertices both representing the same node. That is, these causal links are internal within a particular node. Examples include causal links within a peer node or causal links within an orderer node.

The temporal graph of FIG. 2A represents a secure transaction process performed by a Hyperledger™ Fabric Network, by way of example. This process is described in more detail with respect to FIG. 3, where it is subjected to an attack. Examples of the client, peer and orderer nodes and their actions are also described with respect to FIG. 3.

The notation in the presently illustrated embodiment (which can be varied in other embodiments) is as follows. Each vertex in the temporal graph is assigned a numerical value as shown in Table 1. Then, each graph edge (k,l) in FIG. 2A is assigned a timestamp value $t_{k,l}$ 225 where k represents that the edge begins at node k and ends at node l. The timestamp value indicates the time at which the causal link representing the edge occurred. If the causal link involves a node-to-node message, then this timestamp value indicates when the message was transmitted, received and/or observed in the network.

TABLE 1

| Vertex Name | Integer ID |
| --- | --- |
| Client | 1 |
| Peer2_Invoke | 2 |
| Peer4_Invoke | 3 |
| Peer2_Endorse | 4 |
| Peer4_Endorse | 5 |
| Orderer1_Order | 6 |
| Orderer1_Follower | 7 |
| Orderer2_Follower | 8 |
| Orderer3_Follower | 9 |
| Orderer4_Follower | 10 |
| Peer1_Validate | 11 |
| Peer2_Validate | 12 |
| Peer3_Validate | 13 |
| Peer4_Validate | 14 |

TABLE 1-continued

| Vertex Name | Integer ID |
| --- | --- |
| Peer5_Validate | 15 |
| Peer6_Validate | 16 |
| Peer7_Validate | 17 |
| Peer1_Ledger | 18 |
| Peer2_Ledger | 19 |
| Peer3_Ledger | 20 |
| Peer4_Ledger | 21 |
| Peer5_Ledger | 22 |
| Peer6_Ledger | 23 |
| Peer7_Ledger | 24 |

Table 2 illustrates an example of timestamp values, for purposes of illustration.

TABLE 2

| Time Symbol | Example Time value |
| --- | --- |
| $t_{1,2}$ | 4 |
| $t_{1,3}$ | 5 |
| $t_{2,4}$ | 60 |
| $t_{3,4}$ | 52 |
| $t_{4,6}$ | 94 |
| $t_{5,6}$ | 202 |
| $t_{6,7}$ | 155 |
| $t_{6,8}$ | 143 |
| $t_{6,9}$ | 121 |
| $t_{6,10}$ | 138 |
| $t_{7,7}$ | 213 |
| $t_{8,7}$ | 305 |
| $t_{9,7}$ | 182 |
| $t_{10,7}$ | 177 |
| $t_{7,11}$ | 243 |
| $t_{7,12}$ | 269 |
| $t_{7,13}$ | 251 |
| $t_{7,14}$ | 260 |
| $t_{7,15}$ | 261 |
| $t_{7,16}$ | 312 |
| $t_{7,17}$ | 259 |
| $t_{11,18}$ | 300 |
| $t_{12,19}$ | 318 |
| $t_{13,20}$ | 300 |
| $t_{14,21}$ | 307 |
| $t_{15,22}$ | 312 |
| $t_{16,23}$ | 369 |
| $t_{17,24}$ | 316 |

Figure 2B:
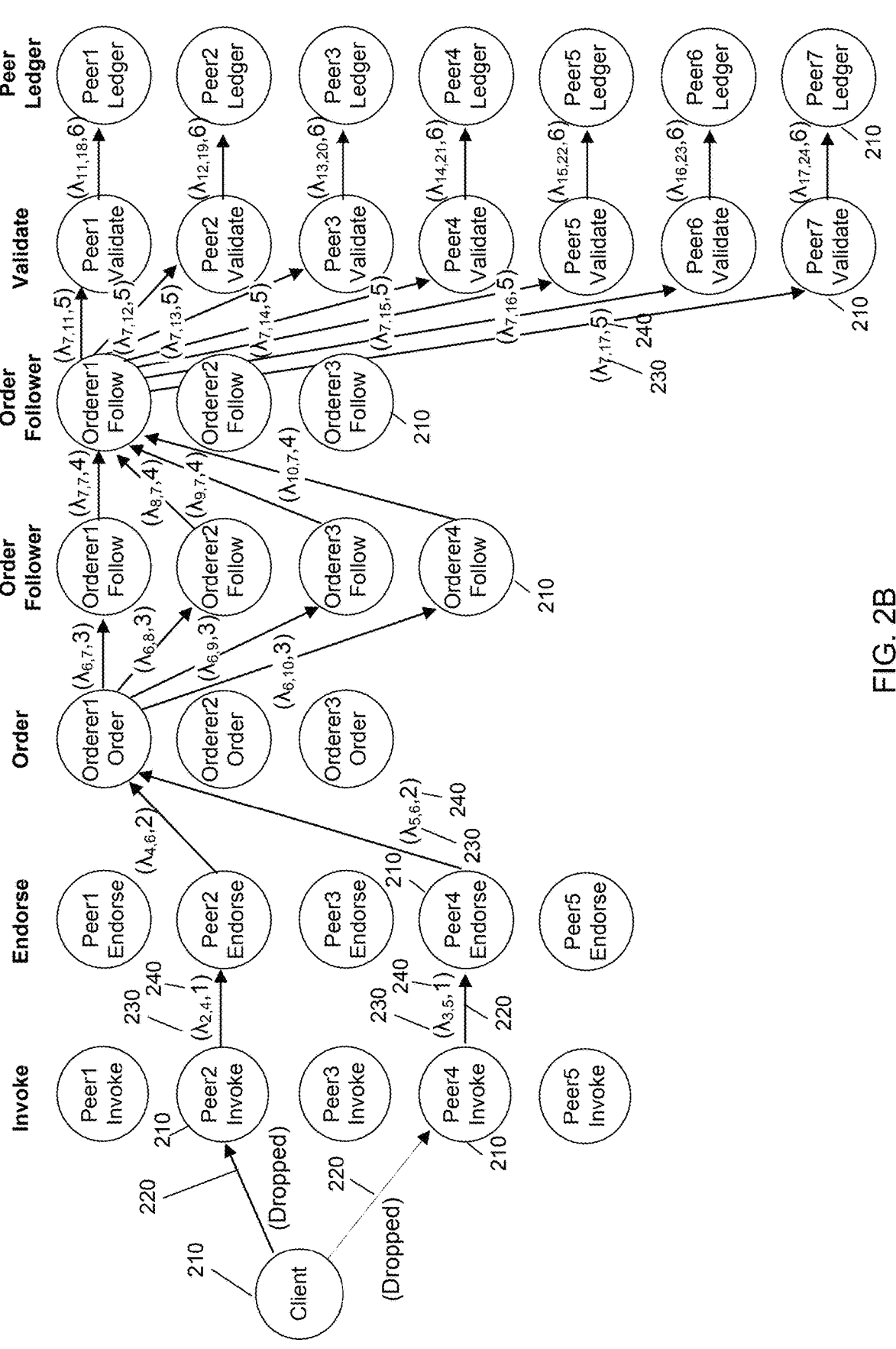
FIG. 2B illustrates the temporal graph of FIG. 2A, with edges assigned latency and ordinal values, according to embodiments of the present disclosure.

In FIG. 1, each causal link (e.g. message or internal path) represented as an edge 220 in the temporal graph is assigned 126 a corresponding latency value and is also assigned 128 a corresponding ordinal value. This process is illustrated with respect to FIG. 2B. The latency values 230 are indicative of an amount of time delay introduced at one of the nodes in association with that causal link (e.g. in association with sending that message). The ordinal values 240 are indicative of a relative order, within a prescribed, ordered multi-step process (or multi-phase procedure), of the causal link (e.g. message). In FIG. 2B, the latency values are denoted $\lambda_{A,B}$, (latency for edge beginning at vertex A and ending at vertex B) while the ordinal values are denoted separately by integers. For ease of exposition, each causal link, corresponding latency value, and corresponding ordinal value can together be considered to define a corresponding triple, which includes all three of these associated entities.

The latency values may 230 be computed from the timestamp values as follows. Each latency value $\lambda_{A,B}$ is computed as a difference between timestamp values $t_{A,B}-t_{C,A}$, where (C,A) is the causal link (edge) which resulted in the causal link (A,B) being generated. If there is no such causal link (C,A) (e.g. at the beginning of the temporal graph) then the latency value and its corresponding ordinal value are not defined. The latency values thus represent the amount of delay in a causal link being instantiated, in view of one or more prior causal links which resulted in its instantiation. Table 3 illustrates examples of latency value calculations, based on the contents of Table 2.

TABLE 3

| Latency Symbol | Formula | Latency Value |
| --- | --- | --- |
| $\lambda_{2,4}$ | $= t_{2,4} - t_{1,2}$ | 56 |
| $\lambda_{3,4}$ | $= t_{3,4} - t_{1,3}$ | 47 |
| $\lambda_{4,6}$ | $= t_{4,6} - t_{2,4}$ | 34 |
| $\lambda_{5,6}$ | $= t_{5,6} - t_{3,4}$ | 150 |
| $\lambda_{6,7}$ | $= t_{6,7} - t_{4,6}$ | 61 |
| $\lambda_{6,8}$ | $= t_{6,8} - t_{4,6}$ | 49 |
| $\lambda_{6,9}$ | $= t_{6,9} - t_{4,6}$ | 27 |
| $\lambda_{6,10}$ | $= t_{6,10} - t_{4,6}$ | 44 |
| $\lambda_{7,7}$ | $= t_{7,7} - t_{6,7}$ | 58 |
| $\lambda_{8,7}$ | $= t_{8,7} - t_{6,8}$ | 162 |
| $\lambda_{9,7}$ | $= t_{9,7} - t_{6,9}$ | 61 |
| $\lambda_{10,7}$ | $= t_{10,7} - t_{6,10}$ | 39 |
| $\lambda_{7,11}$ | $= t_{7,11} - t_{7,7}$ | 30 |
| $\lambda_{7,12}$ | $= t_{7,12} - t_{7,7}$ | 56 |
| $\lambda_{7,13}$ | $= t_{7,13} - t_{7,7}$ | 38 |
| $\lambda_{7,14}$ | $= t_{7,14} - t_{7,7}$ | 47 |
| $\lambda_{7,15}$ | $= t_{7,15} - t_{7,7}$ | 48 |
| $\lambda_{7,16}$ | $= t_{7,16} - t_{7,7}$ | 99 |
| $\lambda_{7,17}$ | $= t_{7,17} - t_{7,7}$ | 46 |
| $\lambda_{11,18}$ | $= t_{11,18} - t_{7,11}$ | 57 |
| $\lambda_{12,19}$ | $= t_{12,19} - t_{7,12}$ | 49 |
| $\lambda_{13,20}$ | $= t_{13,20} - t_{7,13}$ | 49 |
| $\lambda_{14,21}$ | $= t_{14,21} - t_{7,14}$ | 47 |
| $\lambda_{15,22}$ | $= t_{15,22} - t_{7,15}$ | 51 |
| $\lambda_{16,23}$ | $= t_{16,23} - t_{7,16}$ | 57 |
| $\lambda_{17,24}$ | $= t_{17,24} - t_{7,17}$ | 57 |

The ordinal values 240 are also assigned to the edges, where each ordinal value corresponds to a causal link (e.g. message or internal node action) and a latency value. The ordinal values can represent the general order in which causal links occur in an overall prescribed, ordered multi-step and/or chronological process of the secure transaction. In this and other relatively simple examples, the ordinal value of an edge may correspond to the graph distance (e.g. number of intervening nodes) between the initiating vertex (e.g. client) in the temporal graph and the vertex at which that edge begins. Table 4 illustrates examples of ordinal values assigned in this manner, based on the phase of operation in the temporal graph. In some embodiments, as illustrated, two causal links can be assigned the same ordinal value, particularly if they occur generally in parallel. Other approaches can be taken for assigning ordinal values. For example, the ordinal value of a given causal link, beginning at a node, can be assigned so that it is greater than the ordinal value of another causal link which ends at that node and which triggers the given causal link.

TABLE 4

| Start Phase | End Phase | Value |
| --- | --- | --- |
| Client | Invoke | NA |
| Invoke | Endorse | 1 |
| Endorse | Order | 2 |
| Order | Order_Follower | 3 |
| Order_Follower | Order_Follower | 4 |
| Order_Follower | Validate | 5 |
| Validate | Peer Ledger | 6 |

In view of the above, according to various embodiments, a prescribed multi-step process of the network is represented as a temporal graph. Physical nodes of the network (e.g. Hyperledger™ Fabric) are expanded into logical nodes, with a separate logical node (vertex) for each transaction lifecycle phase. Each phase of the transaction lifecycle is assigned an ordinal value. The directed edges in the graph each represent a causal link, such as a message, between two logical nodes. Originally each edge is assigned an absolute time value (timestamp, e.g. in milliseconds) denoted $t_{A,B}$ representing a causal link occurring from node with ID A to node with ID B occurring at time $t_{A,B}$.

Following the assignment of time values, the graph data is processed. Each edge is labelled with a latency indicative of the time taken to execute that phase of the procedure. Each edge is further labelled with the ordinal assigned to that phase of the procedure. The labels may be denoted as pair $(\lambda_{A,B}, i)$ where i=1, 2, . . . , N−1 in a transaction lifecycle consisting of N phases/checkpoints. The latency $\lambda_{A,B}$ is calculated as $\lambda_{A,B}=t_{A,B}-t_{C,A}$ where $t_{A,B}$ is the time of a causal link from node A to B, and $t_{C,A}$ is the time of a causal link that came directly before $t_{A,B}$, which is the causal link (with lower ordinal value) from a prior node C to node A. Additionally, the ordinal value is determined based on the transaction lifecycle phase it exists in.

The temporal graph can be a continuous time network model. In more detail, various ones of the causal links in the temporal graph can be assigned with the latency value and the ordinal value of the triple corresponding to that causal link. It is noted that another graph of the network itself, distinct from the temporal graph of FIGS. 2A and 2B, can also be defined. In this other graph, network nodes are vertices of the graph, and communication links between network nodes are edges of the graph. In such a graph, one or more messages might be passed along each communication link, and thus each edge could be associated with multiple such messages, and their corresponding latencies and ordinal values.

Referring again to FIG. 1, some or all of the edges (e.g. all edges but those from the client node) are assigned 126 a corresponding latency value and ordinal value, as described above. An embedding characterizing the temporal graph is subsequently generated 140. The generating of the embedding can include processing 142 instances of the latency values together with instances of the ordinal values. This processing can include, for at least one (and in various embodiments all) of the causal links (e.g. messages), processing the corresponding latency value of that causal link together with the corresponding ordinal value of that same causal link.

The embedding is then forwarded 150 for processing by a machine learning system. The machine learning processing then performs 160 intrusion detection based on the embedding, and generates 165 an output of the intrusion detection. The output can indicate, for example, whether or not there is an intrusion or potential intrusion. In some embodiments, embodiments focus on the operations 120 to 150, while the monitoring 110 operations the operations 160, 165 of the machine learning system, or both, can be performed separately.

Embodiments of the present disclosure address the problem of capturing latencies of a temporal graph in the form of embeddings, which may be expressed as vectors. The embeddings may be configured so that the are lightweight (e.g. simple vector structure with limited number of entries). Such lightweight embeddings may facilitate or support a machine learning system, for intrusion detection, in that they only require limited amounts of training data. This can be important because the machine learning system is to perform real-time inference in latency-sensitive network environments. Such an approach may further be appropriate in network environments that are one or more of: high performance; require real-time inference; use mobile hardware (low computing power); and are latency-sensitive. Examples of network environments that follow the above criteria may include Internet of Things (IoT) networks (robots, wireless sensors, etc.), blockchain networks, high frequency trading networks, online auction databases etc. The Hyperledger™ Fabric permissioned blockchain in particular requires real-time inference for attack detection and is latency sensitive because differences in time can change the ordering of transactions written to the ledger. There are many other major companies that currently use their own permissioned blockchain systems to do business with trusted vendors such as Walmart™, Deloitte™, SAP™, etc. Deploying attack detection systems on top of well-funded permissioned blockchain networks can potentially be used to defend against costly attacks.

As set forth above, embodiments provide for a graph-level embedding method for capturing latencies in continuous time temporal graphs, with applications to intrusion detection. Two main components of such embodiments are the generating (also referred to as constructing) of the temporal graph and the generating of the embedding of the temporal graph.

In more detail, the temporal graph may be constructed based at least in part on message log data captured from monitored node activity in a network. Temporal graph construction involves constructing the edges, at least some of which represent messages communicated between network nodes (graph vertices) at a given point in time. Temporal graph construction further involves calculating the latencies, which represent the amounts of time delay introduced by nodes in association with such messages and/or latencies for other causal links which might not correspond to messages. The latency can, for example, indicate the amount of time that nodes take to process and pass on a message toward other nodes. The latencies become the edge weights of the temporal graph. A temporal graph can be constructed to reflect a single instance of a secure transaction.

In some embodiments, the intrusion detection system is integrated into the network as follows. When the network executes an event that is to be captured in the temporal graph, a message is sent to the intrusion detection system (IDS), including details of the event. Rather than (or in addition to) storing the event in a log file, the IDS updates the temporal graph to incorporate the event (or starts a new temporal graph if necessary).

After the temporal graph is constructed, the embedding process is performed to create, for example, an n-dimensional vector that captures latency information about the graph. Initially, in various embodiments, four vectors of information are created based on the statistical distribution of latencies of the temporal graph. These vectors are denoted S, A, $O_S$ and $O_A$ and are described elsewhere herein. Then, computing operations such as those involving some or all of: Hadamard product, Dot (inner) product, statistical distance computations (e.g. Kullback Leibler (KL) Divergence) are applied to one or more combinations of these four vectors. Then, various statistical measures are calculated based on the results, and these measures are concatenated (e.g. in the n-dimensional vector) to form the final embedding.

Once generated, the embedding is input into a machine learning system (also referred to as machine learning model) that is capable of interpreting such embeddings and making classifications. In the context of intrusion detection, this typically involves classifying whether the data represents an attack (intrusion) or not. Variants of Random Forests models with Gradient Boosting appear to be suitable for such a classification task.

Embodiments of the present disclosure are applicable in a permissioned blockchain network which is configured to perform secure transactions via the interactions of multiple network nodes. This network can be a Hyperledger™ Fabric permissioned blockchain network, for example. Embodiments, when used in an end-to-end intrusion detection system, are useful for detecting reordering attacks that occur in this permissioned blockchain network. Reordering attacks may be latency-based attacks involving one or more of the nodes delaying transmission of one or more messages. Examples of such an attack are described below.

Figure 3:
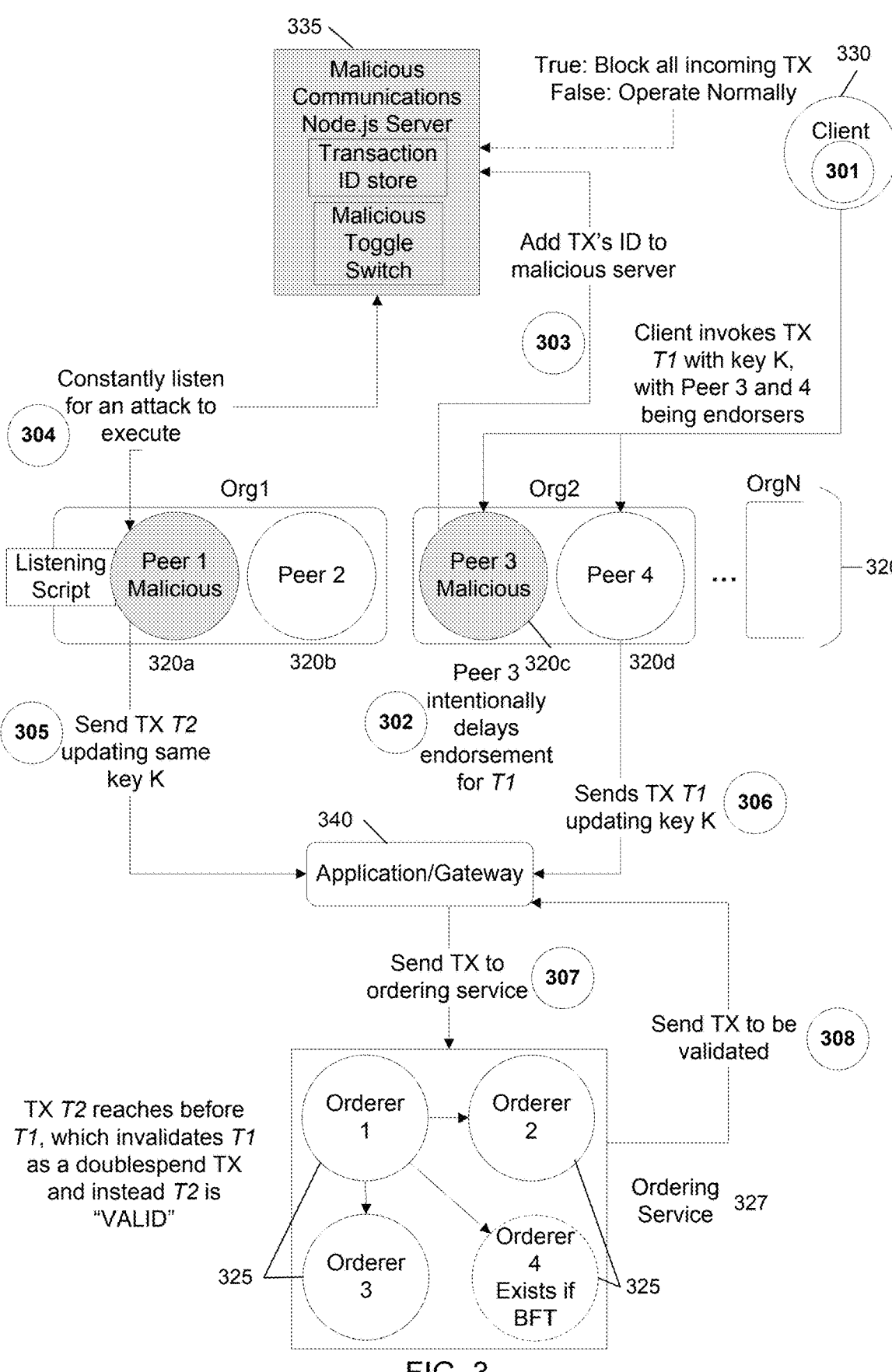
FIG. 3 illustrates a reordering attack which is subject to detection according to embodiments of the present disclosure.

By way of example, FIG. 3 is a detailed diagram illustrating how the reordering attack is carried out in a Hyperledger™ Fabric Network.

FIG. 3 shows an architecture diagram of a Hyperledger™ Fabric network with N peer nodes 320, four orderer nodes 325 grouped in an "ordering service" 327, a node 330 representing the client/user, and an external HTTP malicious server 335 used by malicious nodes to coordinate and carry out attacks. In Hyperledger™ Fabric, the role of peer nodes 320 is to invoke transactions (TX) made by the client, endorse (approve) transactions, and validate transactions before they write them to their personal immutable blockchain ledger. The role of orderer nodes 325 is to gather transactions submitted by peer nodes and collectively form a consensus on the correct ordering of transactions, before these transactions are packaged into blocks. Transactions are meant to be ordered in the same order that they arrive to the "ordering service" which is the central hub for ordering nodes. That is, the ordering service 327 orders (puts in order) transactions in the order that they are received, on a first come first serve basis. The client node 330 represents a real end user that submits transactions to Hyperledger™ Fabric and the Application/Gateway 340 is a gateway point for peer nodes to communicate with the ordering service.

In Hyperledger™ Fabric, in the illustrated embodiment, an endorsement policy is a condition that every transaction must satisfy before it can be sent to the ordering service to be processed. It represents a condition on which combination of peer nodes must "endorse" (approve) the transaction. For the reordering attack to be possible for a given transaction, at least one malicious peer (out of N peer nodes 320) must be an endorser of the transaction. This is a relatively easy condition to satisfy which means this attack can be applied to a wide variety of network scenarios, making this attack even more dangerous.

Given a scenario where a transaction T1 is invoked before transaction T2 on a network, the objective of the reordering attack is to cause transaction T2 to be processed and committed to the ledger before transaction T1, hence the reordering aspect. This is dangerous because if T2 is modifying the same keys as T1 on the blockchain ledger, transaction T2 is unfairly inhibiting T1 from modifying the ledger. In the context of permissioned blockchains which are built on the premise on trustworthy immutable ledgers, this attack can cause serious damage. In FIG. 3 peer 1 320a, peer 3 320c and the external malicious HTTP server 335 are shaded to indicate that these network components are malicious.

FIG. 3 highlights eight ordered steps 301 to 308, of the reordering attack. In step 301, the client node 330 submits transaction T1 to Hyperledger™ Fabric. Peer 4 320d and Peer 3 320c have to endorse the transaction T1. In step 302, peer 3 320c intentionally delays the endorsement to facilitate the attack. In step 303 Peer 3 320c sends transaction T1 information to the external malicious server 335.

In step 304, peer 1 320a, which may be constantly listening to the malicious server 335 for updates, receives an update. In step 305, peer 1 320a creates transaction T2. T2 is a duplicate of transaction T1, with modification of the same transaction information. T2 is sent to the ordering service involving orderer nodes 325 first. In step 306, transaction T1 is now sent to the ordering service after some time. The transaction T2 from peer 1 320a is sent to the ordering service before transaction T1. In step 307, transaction T2 is processed before T1 despite being invoked afterwards. This invalidates transaction T1. In step 308, both transactions are sent back to peers to be written to the ledger.

As can be appreciated, the reason transaction T1 was held back in the above attack was because of an intentionally long delay created by Peer 3 320c. Embodiments of the present disclosure therefore provide for a way to detect such delays/latencies in the context of the entire network. This facilitates the detection and prevention of such reordering attacks.

Figure 4:
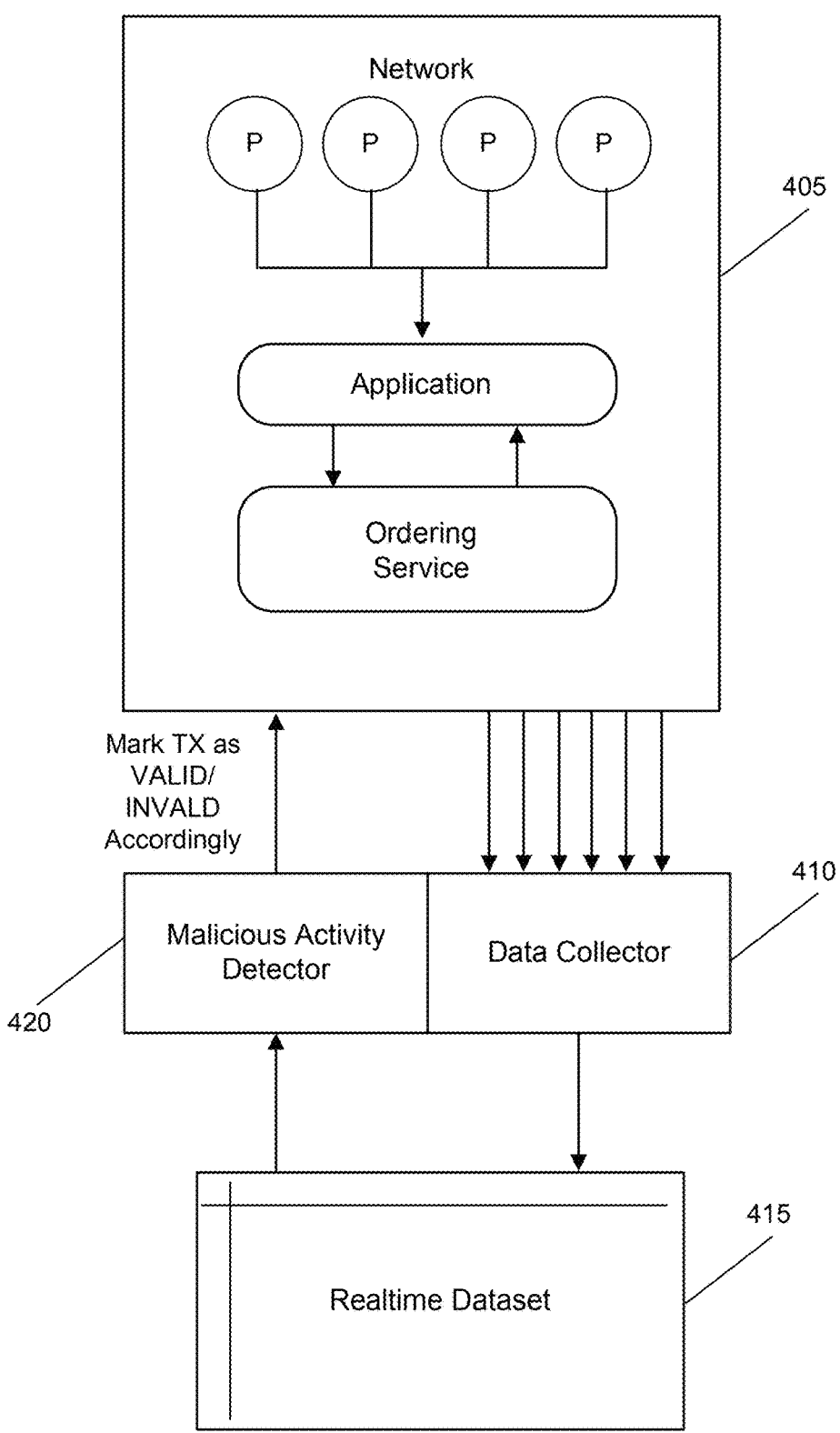
FIG. 4 illustrates aspects of an intrusion detection system according to embodiments of the present disclosure.

Embodiments may provide for a latency based embedding approach for intrusion detection which can be used as part of a larger end-to-end intrusion detection system (IDS) for permissioned blockchains such as Hyperledger™ fabric. FIG. 4 illustrates a high-level infrastructure diagram of such an IDS. The IDS may be built on top of the permissioned blockchain network 405, collecting streams of node activity data via monitoring of the network to perform associated data collection operations 410. The network 405 may be as generally illustrated in FIG. 3. Based on the monitoring, the network and its actions/messages are used to generate a representative temporal graph (e.g. as in FIGS. 2A and 2B), which is referred to in FIG. 4 as the realtime dataset 415. An embedding of the temporal graph can then be performed, and, using the embedding, attacks occurring in the network can be detected and classified for example via a machine learning system, according to malicious activity detection 420.

Figure 5A:
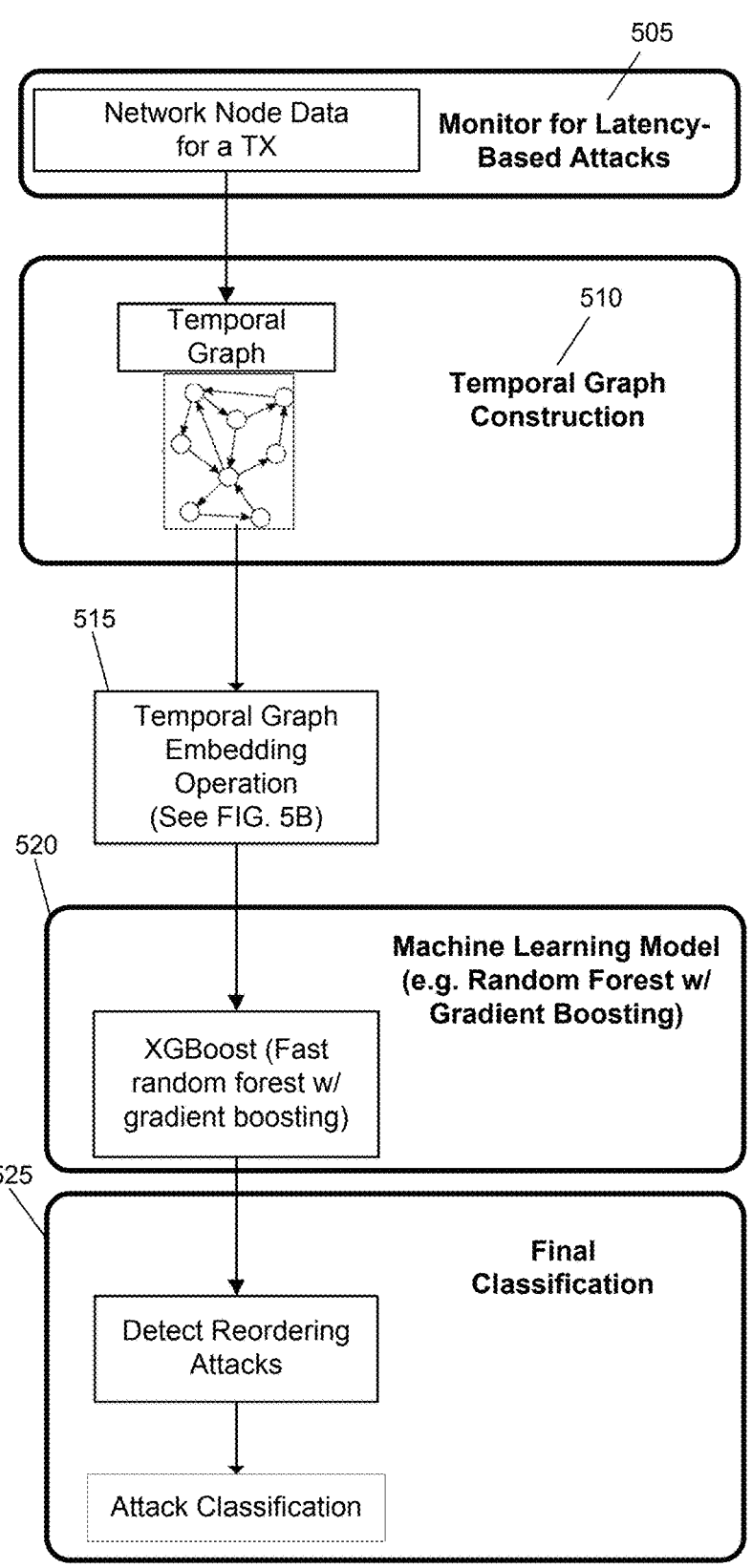
FIGS. 5A and 5B illustrate functional aspects of the intrusion detection system, according to embodiments of the present disclosure.
Figure 5B:
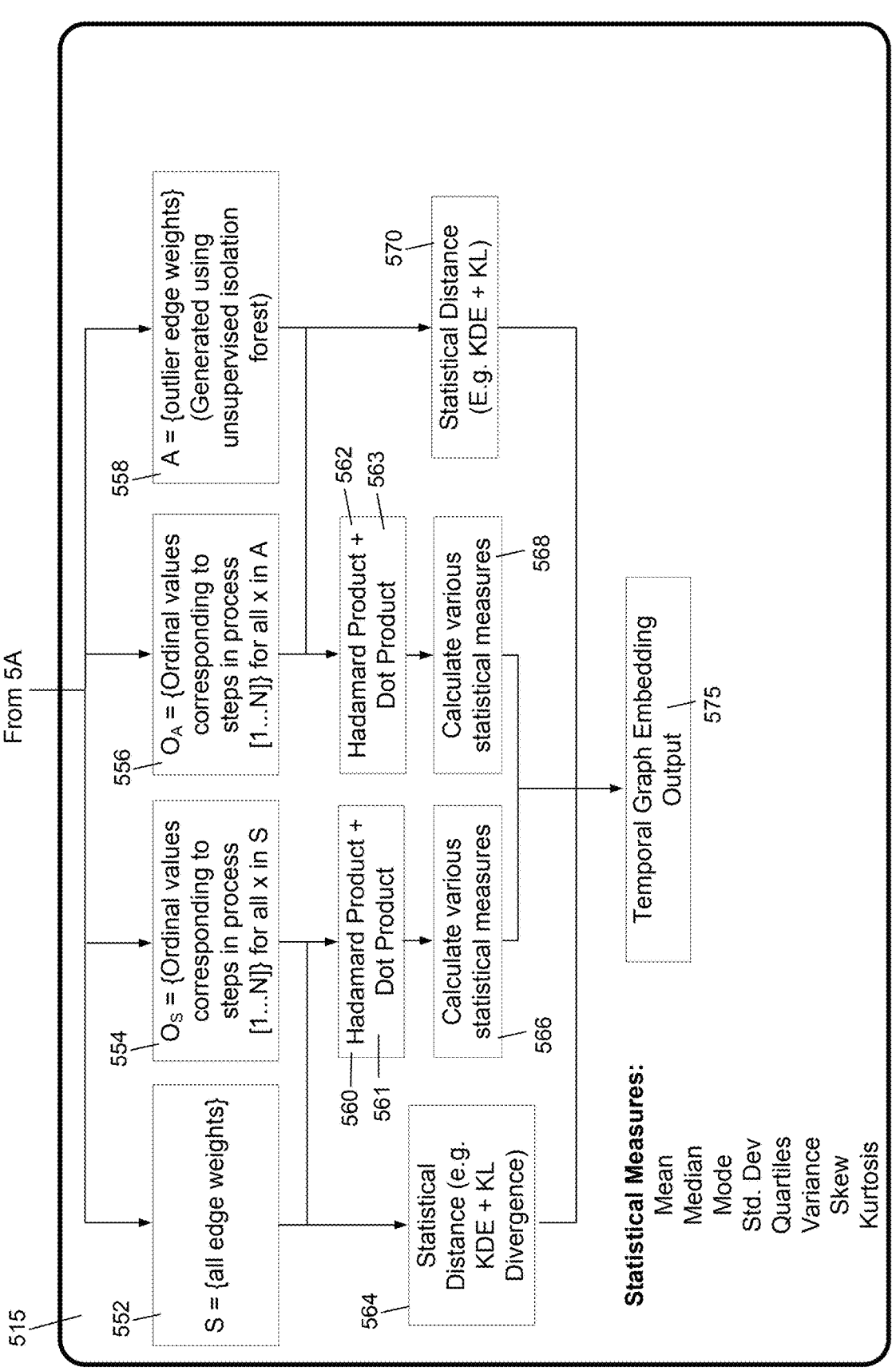
Figure 6:
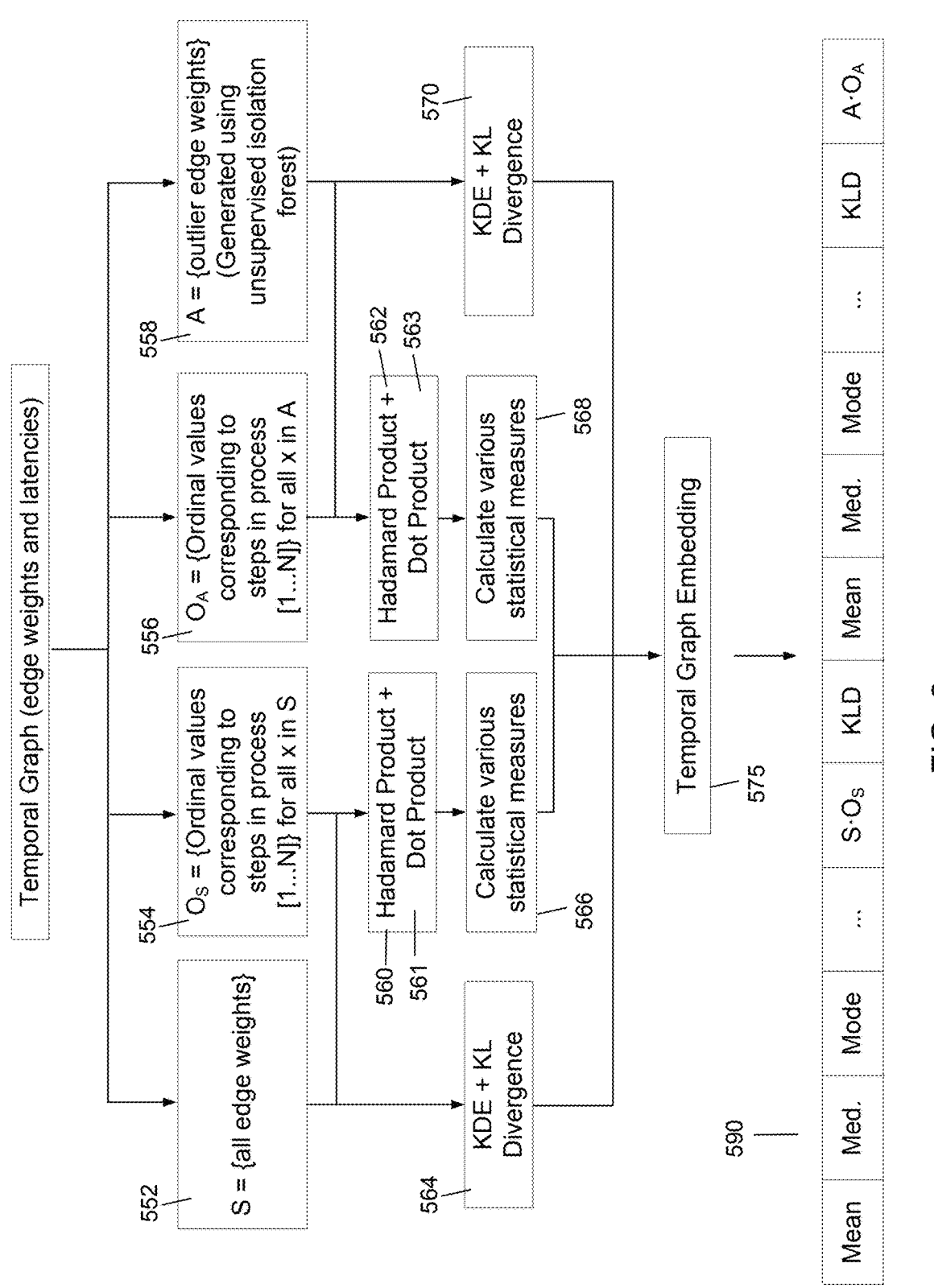
FIG. 6 also illustrates functional aspects of the intrusion detection system, according to embodiments of the present disclosure.

FIGS. 5A and 5B illustrate further details according to embodiments of the present disclosure. Overall, a network is monitored for relevant transaction data, operations are performed to output a final attack classification, and FIGS. 5A and 5B illustrate various components of the end-to-end IDS. FIG. 6, which is similar to FIG. 5A, illustrates operations related to temporal graph embedding in different detail.

The process of FIG. 5A involves monitoring 505 the network for latency-based attacks, which may be (e.g. reordering) attacks in a Hyperledger™ Fabric. This may involve monitoring all the network's node-to-node messaging data, for example captured via the Data Collection component 410 (possibly along with the Realtime Dataset component 415) of the IDS infrastructure of FIG. 4. The monitoring records the occurrence of messages and also the timing of such messages, e.g. when each message is transmitted, or received, or observed passing through the network, or the like, or a combination thereof. This data may represent node interactions in tabular format, where one column holds identifiers (IDs) of starting nodes, one column holds identifiers of destination nodes, and one column holds identifiers of the associated transactions being sent.

Monitoring 505 can be performed for each instance of a secure transaction. When a secure transaction is initiated, monitoring of the messaging associated with that secure transaction can be performed separately from monitoring of messaging associated with other secure transactions. Messaging information for a history of secure transactions can be recorded for later use, e.g. for computing statistical distances or associated reference distributions as described elsewhere herein.

FIG. 5A further illustrates temporal graph construction 510, based on the information from monitoring 505. In this operation, the (e.g. tabular) node messaging data from monitoring 505 is converted into a continuous time network model temporal graph that may also be stored in tabular format or in another data structure or set of data structures.

Referring back to FIGS. 2A and 2B, the operational flow starts from the client vertex 210, and travels through successive layers of temporal graph vertices which represent chronological phases of a transaction lifecycle in the network secure transaction, e.g. according to Hyperledger™ Fabric. Causal links such as messages are shown as directed edges 220 between vertices, and graph vertices (e.g. actions performed by network nodes) are shown as circles 210. The network nodes may be clients, peers, or orderers, for example. The identity of each network node (e.g. "peer1," "peer2," "orderer1," etc.) performing the action of each graph vertex is indicated within the circles 210. The action being performed according to a graph vertex is listed above a column of vertices all performing the same type of action (e.g. "invoke," "endorse," etc.). In practice, the temporal graph can be stored in a particular data format, such as a table or set of tables-generation of a graphic indication of the temporal graph is not necessary for computation purposes.

As discussed above, once the edges in the temporal graph are created, the edge weights (latency values, ordinal values) are calculated. Each edge is assigned a latency value representing latency of one of the messages between network nodes, or else an internal latency between two actions by a same network node. As discussed above with respect to FIGS. 2A and 2B, latencies may be approximated as the time difference two timestamps of two edges. For example, A given network node "Peer2" may perform an invoke action and subsequently an endorse action. A first causal link may connect the invoke action with the endorse action (also performed by the Peer2 node) where the first causal link is timestamped with value $t_{2,4}$. This "Peer2" node may in response send a message to node "Orderer1" which performs an ordering action. The message 820 is timestamped with value $t_{4,6}$. Then the latency of this message is $\lambda_{4,6} = t_{4,6} - t_{2,4}$, i.e. the difference between the timestamp value of the message and the first causal link which triggered the message. This difference is an amount of time delay introduced by the "Peer2" network node, in association with sending the message to the Orderer1 network node. This process for calculating latencies is repeated for all edges and thus all causal links (including messages) in the temporal graph. In this manner, each causal link can be associated with a corresponding latency value indicative of an amount of time delay introduced by a node initiating the causal link (e.g. by sending a corresponding message).

It is also noted that each causal link can be associated with an ordinal value indicative of a relative order, within a prescribed, ordered multi-step process, in which that causal link occurs. For example, in FIG. 2B, the messages with latency values $\lambda_{2,4}$ and $\lambda_{3,4}$ may have an ordinal value of 1, since they are the first causal links following client initiation (the causal links from the client node are not numbered in this embodiment). The causal links with latency values $\lambda_{4,6}$ and $\lambda_{5,6}$ may have an ordinal value of 2, since they are the second causal links, and so on. As already described above, ordinal values may be any values such that a first ordinal value is less than a second ordinal value whenever the causal link associated with the first ordinal value occurs before the causal link associated with the second ordinal value. In some embodiments, causal links that occur simultaneously can have the same ordinal value. A In this context, a triple can indicate a causal link (temporal network edge) 220 in combination with its associated latency value 230 $\lambda_{A,B}$ and its associated ordinal value i.

As illustrated in FIGS. 5A and 5B, following temporal graph construction 510, temporal graph embedding 515 is performed. FIG. 6 shows an expanded view of the temporal graph embedding process. According to this process, an indication of the temporal graph as constructed in operation 510 is processed to generate a temporal graph embedding, for example in the form of a single vector.

According to embodiments, the embedding process 515 starts off by generating four vectors denoted as S, $O_s$, A, and $O_A$. As shown in FIG. 7, given the temporal graph 910, all the latency values 915 (i.e. edge weights) are extracted from the graph. These latency values are processed into an indication of a statistical distribution (probability/frequency distribution, histogram) 930 of all latency values present. This can involve assigning latency values into bins, each bin representing a predetermined range, and counting the number of latency values in each bin, as will be readily understood by a worker skilled in the art. Bins may not be necessary for generating the distribution in other embodiments. The generated distribution can be visualized on a statistical distribution 930 plot as shown in FIG. 7. Vector S is then defined as a vector containing all latency values from the latency distribution (e.g. all values of $\lambda_{A,B}$ present in the temporal graph). Vector A is defined as a set containing all latency values ($\lambda_{A,B}$) which are identified as statistical outliers 940 within the latency distribution 930. The outlier latency values in A may be identified using an unsupervised Isolation Forest model. This may be a machine learning operation usable to identify outliers, the implementation of which will be readily understood by a worker skilled in the art. The outlier latency values are latency values which are identified as being far removed, in a statistical sense, from the typical or expected latency values.

Regarding the ordinal values, every edge in the temporal graph may be mapped to some step in the ordered, chronological lifecycle of a secure transaction (e.g. in Hyperledger™ Fabric or other permissioned blockchain). The transaction lifecycle steps of an embodiment of Hyperledger™ Fabric are Invoke, Endorse, Order, Order Follower, Validate, Peer Ledger Block. However, these can be replaced with any list of N steps representing a prescribed, ordered multi-step chronological process. For example, in FIG. 2B, the edge with latency $\lambda_{2,4}$ results from an "Invoke" step, the edge 815 with $\lambda_{4,6}$ results from an "Endorse" step. Each of these edges can be assigned an ordinal value from 1 to N according to which step is caused by them (or alternatively, causes them) in the ordered, multi-step chronological process of N steps. So, from FIG. 2B, by way of example, edges resulting from an "Invoke" step have an ordinal value label of 1, edges resulting from an "Endorse" step have an ordinal value of 2, edges resulting from an "Order" step have an ordinal value of 3, and so on. Vector $O_8$ is a vector holding the ordinal value for every element in S, and vector $O_A$ holds these ordinal values for every element in A. The ordinal values essentially indicate how far into the transaction lifecycle an edge was present.

So, an edge with value 1 happened relatively early in the transaction lifecycle, and an edge with value N happened near the end.

The components of vectors S and A are ordered in some sense, e.g. according to an increasing order. The components of vectors $O_S$ and $O_A$ follow the same order. That is, if a latency value $\lambda_{A,B}$ is the $n^{th}$ component of vector S or A, then the ordinal value i belonging to the same triple as $\lambda_{A,B}$ is the $n^{th}$ component of the corresponding vector $O_S$ or $O_A$. In other words, $O_S$ and $O_A$ are formed, respectively, of instances of their constituent ordinal values, where each $n^{th}$ entry in the vector $O_S$ and $O_A$ is the corresponding ordinal value of the triple having its corresponding latency value as the $n^{th}$ entry in the vector S and A, respectively.

Tables 5 and 6 illustrate an example of vectors S, $O_S$, A and $O_A$, generated according to the data in Tables 3 and 4, for some identification of statistical outliers.

TABLE 5

| S | $O_S$ |
|---|---|
| 56 | 1 |
| 47 | 1 |
| 34 | 2 |
| 150 | 2 |
| 61 | 3 |
| 49 | 3 |
| 27 | 3 |
| 44 | 3 |
| 58 | 4 |
| 162 | 4 |
| 61 | 4 |
| 39 | 4 |
| 30 | 5 |
| 56 | 5 |
| 38 | 5 |
| 47 | 5 |
| 48 | 5 |
| 99 | 5 |
| 46 | 5 |
| 57 | 6 |
| 49 | 6 |
| 49 | 6 |
| 47 | 6 |
| 51 | 6 |
| 57 | 6 |
| 57 | 6 |

TABLE 6

| A | $O_A$ |
|---|---|
| 34 | 2 |
| 150 | 2 |
| 27 | 3 |
| 162 | 4 |
| 30 | 5 |
| 99 | 5 |

In various embodiments, once the vectors S 552, $O_s$ 554, A 556, and $O_A$ 558 are constructed, they are processed using one or more operations. The output of these operations is referred to as processed information. The processed information can form part or all of the embedding. In some cases, the vectors, or portions thereof, can form part or all of the embedding. In some embodiments, the processed information itself can be further processed by applying one or more statistical measures 566, 568 thereto. The output of the further processing can form part or all of the embedding. For example, the output of the processing operations can be combined with the output of the further processing to form at least part of the embedding. Selected statistical measures are illustrated for example in FIGS. 5B and 6, and can include mean, median, mode, standard deviation, indications of quartiles, variance, skew, kurtosis, etc. Various processing operations and further (statistical) processing operations can be performed, in general. However, for certainty, embodiments involving particular processing operations are described in more detail below.

In various embodiments, processing the vectors S, $O_s$, A, and $O_A$ involves one or more of: computing the Hadamard product $S \odot O_S$ 560 between the vectors $(S, O_s)$, computing the dot (inner) product $S \cdot O_S$ 561 between the vectors $(S, O_s)$, computing the Hadamard product $A \odot O_A$ 562 between the vectors $(A, O_A)$, and computing the dot (inner) product $A \cdot O_A$ 563 between the vectors $(A, O_A)$. In some embodiments, processing the vectors comprises all four of the above operations. It is noted that vectors S and $O_s$ have same size and vectors A and $O_A$ have the same size. The Hadamard product is the element wise product of two vectors, and the Dot product is the sum of the Hadamard product of two vectors. The vectors S, and A represent the latency values present in a graph and the vectors $O_S$ and $O_A$ represent the relative time at which these latencies occur. The Hadamard product essentially multiplies latency values by the time they occur, so that similar latencies that occur at similar times are grouped together. The dot product aggregates these values so that similar distributions of latencies have similar dot product values. This approach provides for an encoding of the temporal aspect of edges into an embedding.

It is considered that, using Hadamard and Dot Product on vectors representing latency distributions and the times at which they occur (indicated by ordinal values), may help machine learning models more readily cluster similar latencies that occur at similar times. This approach also facilitates encoding of the temporal aspect of temporal graphs into the embeddings described herein.

Tables 7 and 8 illustrate the Hadamard products for the vectors of Tables 5 and 6, respectively. The corresponding values for the dot product are $S \cdot O_S = 6316$, and $A \cdot O_A = 1742$.

TABLE 7

| $S \odot O_S$ |
|---|
| 56 |
| 47 |
| 68 |
| 300 |
| 183 |
| 147 |
| 81 |
| 132 |
| 232 |
| 648 |
| 244 |
| 156 |
| 150 |
| 280 |
| 190 |
| 235 |
| 240 |
| 495 |
| 230 |
| 342 |
| 294 |
| 294 |
| 282 |
| 306 |
| 342 |
| 342 |

TABLE 8

$A \odot O_A$

| |
| --- |
| 68 |
| 300 |
| 81 |
| 648 |
| 150 |
| 495 |

In various embodiments, processing the vectors S, $O_s$, A, and $O_A$ involves computing a statistical distance 564, 570. A statistical distance may be a distance measure between a pair of statistical distributions, or similar statistical information. The more dissimilar the two distributions, the larger the statistical distance. Identical distributions would have a statistical distance of zero. There are several statistical distance measures known in the art and usable to calculate the difference between two statistical distributions. These include but are not necessarily limited to: Kullback-Liebler (KL) Divergence; the Jensen-Shannon (JS) divergence; and the Kolmogorov-Smirnov (KS) statistic or test.

Statistical distance can be used to describe the difference between latency distributions such as illustrated in FIG. 7. Distributions with more anomalous/extreme latency values will tend to have more extreme distance (e.g. KL Divergence) values when compared against a normal (reference) latency distribution. Encoding this measure into a single number using statistical distance can assist machine learning models in readily differentiating between latency distributions. Using statistical distance to compare shapes of latency distributions may facilitate machine learning models in accurately differentiating between distributions with many anomalies and those with few anomalies.

In more detail, and in various embodiments, computing statistical distance can involve computing a statistical distance between: a statistical distribution representative of the vector A; and a reference statistical distribution indicative of the latency values in absence of the intrusion. That is, the reference statistical distribution is a distribution indicating acceptable or nominal frequencies of occurrence of the latency values, in a case where no intrusion is present. Additionally or alternatively, computing statistical distance can involve computing a statistical distance between: a statistical distribution representative of the vector S; and the same or another reference statistical distribution. The reference statistical distribution may be based at least in part on a history of secure transactions executed in the network prior to said one instance of the secure transaction.

The reference distribution may be a statistical distribution based on the combined latencies for all transactions that have happened in the past and that were not labelled as being subject to an attack. A few hundred such transactions may be sufficient for generating the reference distribution. The dimension size of the reference distribution may be at least 1000 in some embodiments. The reference distribution may be constructed in the same way as the statistical distribution representative of vector S. In fact, statistical distributions representative of vector S (where no attack is present or detected) can be combined together to generate the reference distribution. The reference distribution may be a cumulative history of vectors S indicative of past transactions, or at least indicative of past transactions for which no intrusion is detected. For example, multiple such statistical distributions can be averaged together or otherwise combined. Additionally or alternatively, the reference distribution may be based at least in part on a prescribed distribution which is generated according to an expert or mathematical model, indicative of nominal latencies when an attack is not present.

It is noted that, when a statistical distribution is discrete, but the statistical distance measure operates on continuous statistical distributions, Kernel Density Estimation (KDE) or a similar operation may be performed to convert discrete statistical distributions as shown in FIG. 7 into the appropriate (e.g. smooth) continuous distributions. Therefore, such operations may be performed prior to or as part of computing statistical distances. If the reference distribution is discrete, it may also be subjected to conversion to a continuous distribution.

In various embodiments, the processed information, e.g. the outputs of the Hadamard and/or dot product operations applied to (S, $O_s$) and/or (A, $O_A$), provides for a distribution of latency values scaled by their corresponding times as denoted by ordinal values. To capture this distribution for machine learning models to interpret, various statistical measures of such information can be computed 566, 568. Such statistical measures include weighted or unweighted average, mean, median, mode, standard deviation, indication of quartiles, variance, skew, kurtosis, or the like, or a combination thereof. In some embodiments, such statistical measures can be computed for the Hadamard product of (S, $O_s$) (operation 566). In some embodiments, such statistical measures can be computed for the Hadamard product of (A, $O_A$) (operation 568). Outputs of the statistical processing can be concatenated with other output values (if any) to generate a single vector, which may be used as the generated temporal graph embedding 575.

Each statistical measure computed on the Hadamard products $S \odot O_S$ and $A \odot O_A$ may be calculated element-wise for every vector (where applicable), and may output a single numerical value. For example, the mean of the vector is the average of all its individual elements. In some embodiments, the sum of all vector elements in the Hadamard product (which is equal to the dot product) can be used in place of the mean.

Referring back to FIG. 5, the temporal graph embedding 515 output is provided to an appropriate machine learning model 520 to generate classifications. As illustrated, the machine learning model may be a Random Forest model with Gradient Boosting, although other types of machine learning models can be used. It is considered that the Random Forest model with Gradient Boosting may be particularly suitable for use in the present application.

The temporal graph embedding output can be a vector constructed from some or all of the following: some or all outputs of the statistical processing applied to $S \odot O_S$ and/or $A \odot O_A$; the dot products of (S, $O_s$) and/or (A, $O_A$); and the statistical distances applied to S and/or A each relative to reference distribution R. FIG. 6 illustrates an example of such an embedding 590. This example embedding includes, in order, the outputs of the statistical processing applied to $S \odot O_s$ (e.g. mean, median, mode, etc.) followed by the dot product of (S, $O_s$), followed by the statistical distance (KLD) between S and R. This is followed by the outputs of the statistical processing applied to $A \odot O_A$ (e.g. mean, median, mode, etc.) followed by the dot product of (A, $O_A$), followed by the statistical distance (KLD) between A and R.

Table 9 illustrates an example temporal graph embedding generated based on the contents of Tables 5 to 8. The reference distribution in this example is generated from 1000 samples taken from a normal distribution with mean 50 and standard deviation 10. KDE( ) represents the KDE operation applied to a distribution, and KL (,) represents the KL distance operation applied to two distributions. The statistical measures are applied to the Hadamard products. The first 13 entries correspond to S and $O_s$ and the last 13 entries correspond to A and $O_A$.

TABLE 9

| | |
|---|---|
| Mean | 242.923 |
| q(1.0) (max) | 648 |
| q(0.0) (min) | 47 |
| q(0.75) (3$^{rd}$ quartile) | 298.5 |
| q(0.5) (median, 2$^{nd}$ quartile) | 237.5 |
| q(0.25) (1$^{st}$ quartile) | 151.5 |
| Variance | 17193.225 |
| Standard Deviation | 131.123 |
| Mode | 342 |
| Skew | 0.999 |
| Kurtosis | 1.684 |
| S · $O_S$ | 6316 |
| KL(KDE(S), KDE(R)) | 72.540 |
| Mean | 290.333 |
| q(1.0) (max) | 648 |
| q(0.0) (min) | 68 |
| q(0.75) (3$^{rd}$ quartile) | 446.25 |
| q(0.5) (median, 2$^{nd}$ quartile) | 225.0 |
| q(0.25) (1$^{st}$ quartile) | 98.25 |
| Variance | 47142.222 |
| Standard Deviation | 217.123 |
| Mode | 68 |
| Skew | 0.511 |
| Kurtosis | −1.285 |
| A · $O_A$ | 1742 |
| KL(KDE(A), KDE (R)) | 377.069 |

Figure 8:
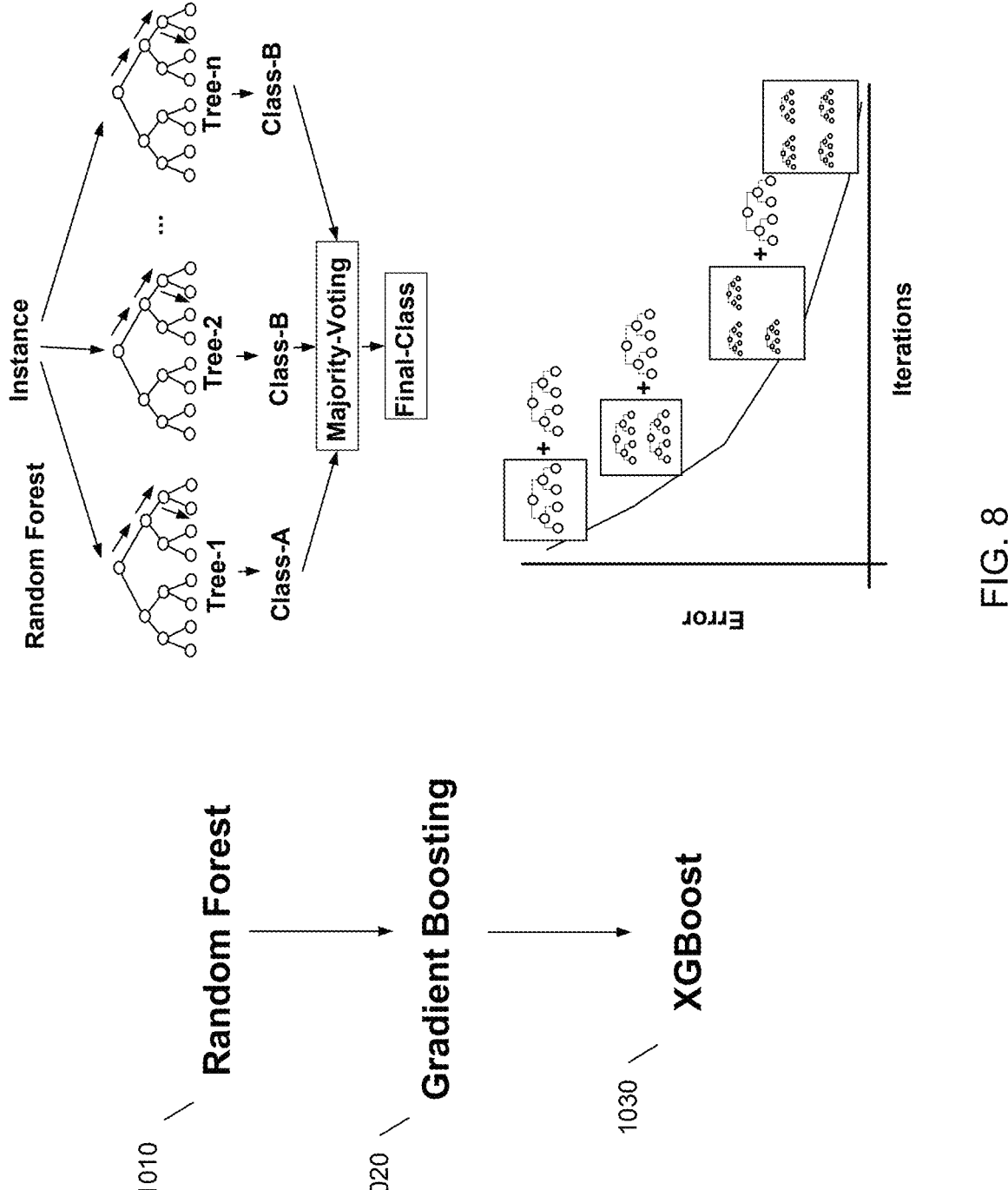
FIG. 8 illustrates a random forest model for intrusion detection based on a temporal graph embedding, according to embodiments of the present disclosure.

As will be readily understood by a worker skilled in the art, and with reference to FIG. 8 Random Forest models 1010 create many (e.g. hundreds) of decision trees in parallel that are trained on random subsets of the embeddings/data. The resulting classifications are then aggregated into one final classification. Gradient Boosting 1020, which may be viewed as an improvement or variation on top of Random Forests, involves decision trees being built sequentially so that every new decision tree is trained to minimize the residual errors of the previous set of decisions trees. One parallelized implementation of Gradient Boosted Random Forests, called XGBoost 1030, may be suitable for use in embodiments of the present disclosure, operating on the embeddings to generate classifications.

It is considered that Random Forest machine learning models may work well in embodiments, because they are tree-based models which don't require data to be scaled or normalized, and are relatively less prone to overfitting.

Output of the machine learning model 520 is provided for use in final classification 525. In various embodiments, the machine learning (e.g. Random Forest) model that is trained and operated using the embeddings 515, creates binary classifications that represent whether the given data for a transaction is indicative of an attack or not. In the larger context of an IDS as shown for example in FIG. 4, if the transaction is classified as being indicative of an attack, this information may be written to the ledger with an "INVALID" tag so that it doesn't affect the rest of the network. If the transaction is not classified as being indicative of an attack, this information may be is written to the ledger with a "VALID" tag and the network proceeds as usual. Embodiments, including the disclosed embedding method, may thus be a core component of an IDS for Hyperledger™ Fabric that detects and mitigates reordering attacks in real time. More generally, the machine learning and final classification systems operate to detect intrusions based on an embedding, and to generate an output indicative of the intrusion detection.

In view of the above, in various embodiments, a temporal graph embedding method is provided which includes capturing the states of latencies in temporal graphs, thereby allowing machine learning models to readily capture anomalous delays/latencies in temporal graphs. In the context of Intrusion Detection these anomalous latencies can represent intentional delays created by nodes to carry out attacks.

As described above, Isolation Forests may be used to generate the vector A which indicates the outlier latency values. This is a general task and there are several ways of picking suitable outliers from a distribution of latency values. Outliers can be identified for example using standard deviations, hardcoded thresholds, etc.

Furthermore, in various embodiments, vectors such as $O_S$ and $O_A$ have discrete integer entries, indicative of transaction lifecycle (e.g. of Hyperledger™ Fabric) can be divided into N discrete chronological steps. However, continuous representations indicative of ordinal value of causal links and/or messages may also be used. In general, these vectors usefully represent the relative time values for every element in vector S and A.

The set of statistical measures illustrated for example in FIGS. 5B and 6 are selected to potentially work well with permissioned blockchain (e.g. Hyperledger™ Fabric) messaging data. However, for other applications this set of statistical measures may be modified to include additional measures such as range, maximum value, minimum value, or the like. Additionally or alternatively, some measures may be removed based on performance considerations in a given scenario. A general objective of these measures is to provide sufficient detail to the machine learning algorithm about the differentiating properties of a distribution.

Figure 9:
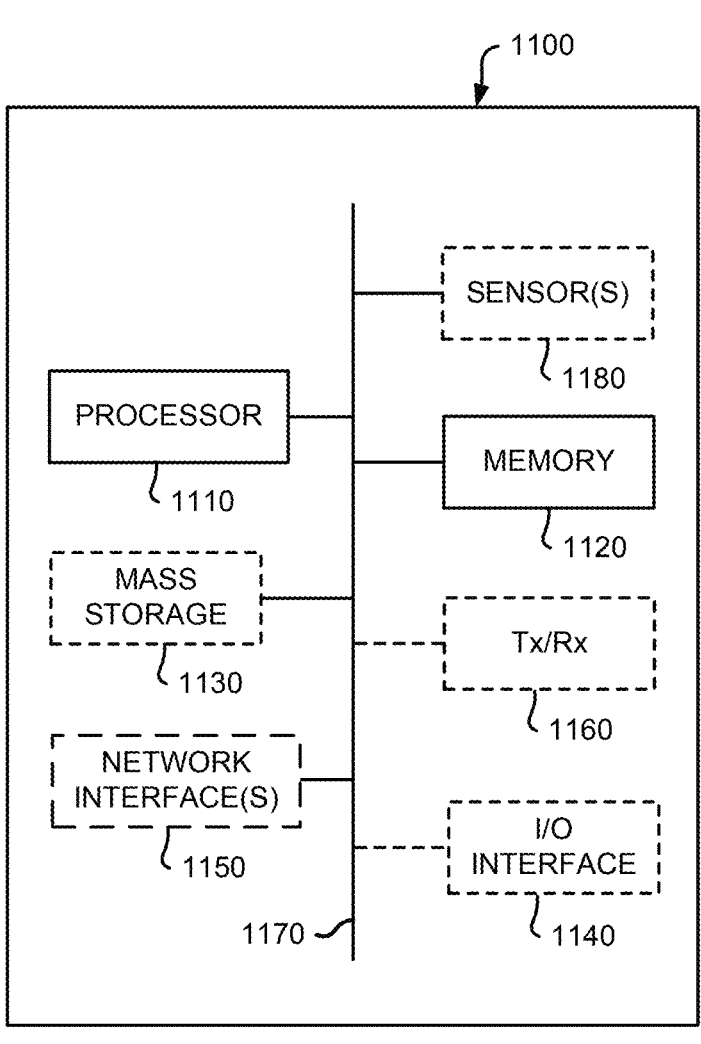
FIG. 9 is a schematic illustration of an electronic device that may perform any or all of operations of the methods and features explicitly or implicitly described herein, according to embodiments of the present disclosure.

FIG. 9 shows a schematic diagram of an electronic device 1100 that may perform any or all of the operations of the above methods and features explicitly or implicitly described herein, according to different embodiments of the present disclosure. For example, a computer equipped with network function may be configured as electronic device 1100. The electronic device 1100 may be used to implement the embodiments of any one or more of FIGS. 1 to 10, for example.

As shown, the electronic device 1100 may include a processor 1110, such as a Central Processing Unit (CPU) or specialized processors such as a Graphics Processing Unit (GPU) or other such processor unit, memory 1120, network interface 1150, and a bi-directional bus 1170 to communicatively couple the components of electronic device 1100. Electronic device 1100 may also include as needed non-transitory mass storage 1130, an I/O interface 1140, and a transceiver 1160. According to certain embodiments, any or all of the depicted elements may be utilized, or only a subset of the elements. Further, the electronic device 1100 may contain multiple instances of certain elements, such as multiple processors, memories, or transceivers. Also, elements of the hardware device may be directly coupled to other elements without the bi-directional bus 1170. Additionally or alternatively to a processor and memory, other electronics, such as integrated circuits, computer chips or chipsets, or the like, may be employed for performing the required logical operations.

The memory 1120 may include any type of tangible, non-transitory memory such as static random access memory (SRAM), dynamic random access memory (DRAM), synchronous DRAM (SDRAM), read-only memory (ROM), any combination of such, or the like. The mass storage element 1130 may include any type of tangible, non-transitory storage device, such as a solid state drive, hard disk drive, a magnetic disk drive, an optical disk drive, USB drive, or any computer program product configured to store data and machine executable program code. According to certain embodiments, the memory 1120 or mass storage 1130 may have recorded thereon statements and instructions executable by the processor 1110 for performing any of the aforementioned method operations described above.

Network interface(s) 1150 may include at least one of a wired network interface and a wireless network interface. The network interface 1150 may include a wired network interface to connect to a communication network 1150 and may also include a radio access network interface for connecting to the communication network or other network elements over a radio link. The network interface 1150 enables the electronic device 1100 to communicate with remote entities such as those connected to the communication network.

It will be appreciated that, although specific embodiments of the technology have been described herein for purposes of illustration, various modifications may be made without departing from the scope of the technology. The specification and drawings are, accordingly, to be regarded simply as an illustration of the invention as defined by the appended claims, and are contemplated to cover any and all modifications, variations, combinations or equivalents that fall within the scope of the present disclosure. In particular, it is within the scope of the technology to provide a computer program product or program element, or a program storage or memory device such as a magnetic or optical wire, tape or disc, or the like, for storing signals readable by a machine, for controlling the operation of a computer according to the method of the technology and/or to structure some or all of its components in accordance with the system of the technology.

Acts associated with the method described herein can be implemented as coded instructions in a computer program product. In other words, the computer program product is a computer-readable medium upon which software code or instructions are recorded to execute the method when the computer program product is loaded into memory and executed on the microprocessor of the wireless communication device.

Further, each operation of the method may be executed on any computing device, such as a personal computer, server, PDA, or the like and pursuant to one or more, or a part of one or more, program elements, modules or objects generated from any programming language, such as C++, Java, or the like. In addition, each operation, or a file or object or the like implementing each said operation, may be executed by special purpose hardware or a circuit module designed for that purpose.

Through the descriptions of the preceding embodiments, the present disclosure may be implemented by using hardware only or by using software and a necessary universal hardware platform. Based on such understandings, the technical solution of the present disclosure may be embodied in the form of a software product. The software product may be stored in a non-volatile or non-transitory storage medium, which can be a compact disk read-only memory (CD-ROM), USB flash disk, or a removable hard disk. The software product may include a number of instructions that enable a computer device (personal computer, server, or network device) to execute the methods provided in the embodiments of the present disclosure. For example, such an execution may correspond to a simulation of the logical operations as described herein. The software product may additionally or alternatively include number of instructions that enable a computer device to execute operations for configuring or programming a digital logic apparatus in accordance with embodiments of the present disclosure.

The word "a" or "an" when used in conjunction with the term "comprising" or "including" in the claims and/or the specification may mean "one", but it is also consistent with the meaning of "one or more", "at least one", and "one or more than one" unless the content clearly dictates otherwise. Similarly, the word "another" may mean at least a second or more unless the content clearly dictates otherwise.

The terms "coupled", "coupling" or "connected" as used herein can have several different meanings depending on the context in which these terms are used. For example, as used herein, the terms coupled, coupling, or connected can indicate that two elements or devices are directly connected to one another or connected to one another through one or more intermediate elements or devices via an electronic element depending on the particular context. The term "and/or" herein when used in association with a list of items means any one or more of the items comprising that list.

Although a combination of features is shown in the illustrated embodiments, not all of them need to be combined to realize the benefits of various embodiments of this disclosure. In other words, a system or method designed according to an embodiment of this disclosure will not necessarily include all features shown in any one of the Figures or all portions schematically shown in the Figures. Moreover, selected features of one example embodiment may be combined with selected features of other example embodiments.

Although the present disclosure has been described with reference to specific features and embodiments thereof, it is evident that various modifications and combinations can be made thereto without departing from the disclosure. The specification and drawings are, accordingly, to be regarded simply as an illustration of the invention as defined by the appended claims, and are contemplated to cover any and all modifications, variations, combinations or equivalents that fall within the scope of the present disclosure.

What is claimed is:

1. A method for facilitating intrusion detection in a network having network nodes communicating messages to one another to support secure transactions, the method comprising:

monitoring the network to determine, for one instance of the secure transactions, occurrences of the messages and associated timing information corresponding to said one instance;

generating, based on said monitoring, an indication of a temporal graph having vertices representing actions of the network nodes and edges representing causal paths between the vertices, the causal paths including the messages, wherein:

each one of a plurality of the causal paths is associated with a corresponding latency value and a corresponding ordinal value, the latency value indicative of an amount of time delay introduced at one of the network nodes in association with generating said one of the plurality of causal paths, the ordinal value indicative of a relative order, within a prescribed, ordered multi-step process, of said one of the plurality of causal paths;

generating an embedding characterizing the temporal graph, the generating of the embedding comprising processing instances of the latency values together with instances of the ordinal values, including, for at least one of the plurality of causal paths, processing the corresponding latency value of said one of the plurality of causal paths together with the corresponding ordinal value of said one of the plurality of causal paths;

forwarding the embedding for processing by a machine learning system; and performing, by the machine learning system, the intrusion detection based on the embedding, and generating an output indicating whether or not an intrusion is detected.

2. The method of claim 1, wherein the intrusion involves a reordering attack, the reordering attack being a latency-based attack involving one or more of the network nodes delaying transmission of one or more of the messages.

3. The method of claim 1, wherein the network implements a permissioned blockchain to carry out the secure transactions.

4. The method of claim 3, wherein the permissioned blockchain corresponds to Hyperledger™ fabric.

5. The method of claim 1, wherein the embedding comprises multiple values representable as a vector.

6. The method of claim 1, wherein, for each one of the plurality of causal paths, the corresponding latency value, the corresponding ordinal value, and said one of the causal paths together define a corresponding triple, and wherein generating the embedding comprises:

determining a vector A formed of instances of the latency values which are statistical outliers relative to a vector S comprising all of the latency values;

determining the vector S formed of all of the latency values;

determining a vector $O_A$ formed of instances of the ordinal values, each $n^{th}$ entry in the vector $O_A$ being the corresponding ordinal value of the triple having its corresponding latency value as the $n^{th}$ entry in the vector A; and determining a vector $O_S$ formed of instances of the ordinal values, each $n^{th}$ entry in the vector $O_S$ being the corresponding ordinal value of the triple having its corresponding latency value as the $n^{th}$ entry in the vector S.

7. The method of claim 6, wherein generating the embedding comprises processing the vector A, the vector S, the vector $O_A$ and the vector $O_S$ using one or more operations to generate processed information.

8. The method of claim 7, wherein the processed information forms part or all of the embedding.

9. The method of claim 7, wherein generating the embedding comprises further processing of the processed information according to one or more statistical measures, wherein output of the further processing forms part or all of the embedding.

10. The method of claim 7, wherein the one or more operations comprise one or more of:

computing a Hadamard product between the vector A and the vector $O_A$;

computing a Hadamard product between the vector S and the vector $O_S$;

computing a dot (inner) product between the vector A and the vector $O_A$;

computing a dot (inner) product between the vector S and the vector $O_S$; and computing a statistical distance between: a statistical distribution representative of the vector A; and a reference statistical distribution indicative of the latency values in absence of the intrusion; and computing a statistical distance between: a statistical distribution representative of the vector S; and the reference statistical distribution.

11. The method of claim 10, wherein generating the embedding comprises further processing of the processed information according to one or more statistical measures, wherein output of the further processing forms part or all of the embedding, and wherein the further processing comprises generating the statistical measures for one or more of:

the Hadamard product between the vector A and the vector $O_A$; and the Hadamard product between the vector S and the vector $O_S$.

12. The method of claim 10, wherein the reference statistical distribution is based on a history of secure transactions executed in the network prior to said one instance of the secure transaction.

13. The method of claim 10, wherein the statistical distance is a Kullback-Leibler divergence, a Jensen-Shannon divergence or a Kolmogorov-Smirnov statistic.

14. The method of claim 6, wherein the determining the vector A is performed using an unsupervised isolation forest machine learning operation.

15. A computing apparatus for facilitating intrusion detection in a network having network nodes communicating messages to one another to support secure transactions, the apparatus configured to:

monitor the network to determine, for one instance of the secure transactions, occurrences of the messages and associated timing information corresponding to said one instance;

generate, based on said monitoring, an indication of a temporal graph having vertices representing actions of the network nodes and edges representing causal paths between the vertices, the causal paths including the messages, wherein:

each one of a plurality of the causal paths is associated with a corresponding latency value and a corresponding ordinal value, the latency value indicative of an amount of time delay introduced at one of the network nodes in association with generating said one of the plurality of causal paths, the ordinal value indicative of a relative order, within a prescribed, ordered multi-step process, of said one of the plurality of causal paths;

generate an embedding characterizing the temporal graph, the generating of the embedding comprising processing instances of the latency values together with instances of the ordinal values, including, for at least one of the plurality of causal paths, processing the corresponding latency value of said one of the plurality of causal paths together with the corresponding ordinal value of said one of the plurality of causal paths;

forward the embedding for processing by a machine learning system; and perform, by the machine learning system, the intrusion detection based on the embedding, and generate an output indicating whether or not an intrusion is detected.

16. The apparatus of claim 15, wherein, for each one of the causal paths, the corresponding latency value, the corresponding ordinal value and said one of the plurality of causal paths collectively define a corresponding triple, and wherein generating the embedding comprises:

determining a vector A formed of instances of the latency values which are statistical outliers relative to a vector S comprising all of the latency values;

determining the vector S formed of all of the latency values;

determining a vector $O_A$ formed of instances of the ordinal values, each $n^{th}$ entry in the vector $O_A$ being the corresponding ordinal value of the triple having its corresponding latency value as the $n^{th}$ entry in the vector A; and determining a vector $O_S$ formed of instances of the ordinal values, each $n^{th}$ entry in the vector $O_S$ being the corresponding ordinal value of the triple having its corresponding latency value as the $n^{th}$ entry in the vector S.

17. The apparatus of claim 16, wherein generating the embedding comprises processing the vector A, the vector S, the vector $O_A$ and the vector $O_S$ using one or more operations to generate processed information.

18. The apparatus of claim 17, wherein generating the embedding comprises further processing of the processed information according to one or more statistical measures, wherein output of the further processing forms part or all of the embedding.

19. The apparatus of claim 17, wherein the one or more operations comprise one or more of:

computing a Hadamard product between the vector A and the vector $O_A$;

computing a Hadamard product between the vector S and the vector $O_S$;

computing a dot (inner) product between the vector A and the vector $O_A$;

computing a dot (inner) product between the vector S and the vector $O_S$; and computing a statistical distance between: a statistical distribution representative of the vector A; and a reference statistical distribution indicative of the latency values in absence of the intrusion; and computing a statistical distance between: a statistical distribution representative of the vector S; and the reference statistical distribution.

20. The apparatus of claim 19, wherein the statistical distance is a Kullback-Leibler divergence, a Jensen-Shannon divergence or a Kolmogorov-Smirnov statistic.

\* \* \* \* \*